US008750116B2

(12) United States Patent  
Hande et al.

(10) Patent No.: US 8,750,116 B2  
(45) Date of Patent: *Jun. 10, 2014

(54) METHODS AND APPARATUS FOR COMMUNICATING AND/OR USING LOAD INFORMATION IN SUPPORT OF DECENTRALIZED TRAFFIC SCHEDULING DECISIONS

(75) Inventors: Prashanth Hande, Jersey City, NJ (US); Xinzhou Wu, Monmouth Junction, NJ (US); Sundeep Rangan, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 495 days.

This patent is subject to a terminal disclaimer.

(21) Appl. No.: 12/268,138

(22) Filed: Nov. 10, 2008

(65) Prior Publication Data

US 2009/0257351 A1    Oct. 15, 2009

Related U.S. Application Data

(60) Provisional application No. 61/045,030, filed on Apr. 15, 2008.

(51) Int. Cl.  
H04L 12/26      (2006.01)  
H04W 28/02    (2009.01)

(52) U.S. Cl.  
CPC .................................... *H04W 28/02* (2013.01)  
USPC .......................................... 370/235; 370/252

(58) Field of Classification Search  
None  
See application file for complete search history.

(56) References Cited

U.S. PATENT DOCUMENTS

| 7,404,211 | B2* | 7/2008 | Kanno et al. ..................... 726/22 |
| 7,593,334 | B1* | 9/2009 | Mammen et al. ............. 370/235 |
| 2003/0202476 | A1* | 10/2003 | Billhartz et al. .............. 370/236 |
| 2005/0138451 | A1 | 6/2005 | Simpson et al. |

(Continued)

FOREIGN PATENT DOCUMENTS

| CN | 1894731 A | 1/2007 |
| CN | 101039277 A | 9/2007 |

(Continued)

OTHER PUBLICATIONS

International Search Report & Written Opinion—PCT/US2009/040576, International Search Authority—European Patent Office—Nov. 18, 2009.

(Continued)

*Primary Examiner* — Rhonda Murphy  
(74) *Attorney, Agent, or Firm* — Stanton Braden

(57) ABSTRACT

Methods and apparatus related to communicating and/or using load information in support of decentralized traffic scheduling decisions are described. Individual wireless terminals corresponding to a peer to peer connection which desire to communicate traffic signals make transmitter yielding and/or receiver yielding decisions on a traffic slot by traffic slot basis. Loading information is used to intentionally skew transmitter yielding decisions in response to conditions and/or needs in the system. A link load weight value is generated based on intended transmitter loading related information and/or intended receiver loading related information. Traffic request parameters and/or link load weight values are communicated between wireless communications devices in request and/or request response signaling. As part of a transmitter yielding decision, one or more of: a spillage value, weighted SINR, and an interference cost estimate is calculated based on: one or more link load weight values and channel condition measurement information.

40 Claims, 17 Drawing Sheets

(56) References Cited

U.S. PATENT DOCUMENTS

| | | | |
|---|---|---|---|
| 2005/0273514 A1* | 12/2005 | Milkey et al. | 709/232 |
| 2005/0286426 A1 | 12/2005 | Padhye et al. | |
| 2006/0205396 A1* | 9/2006 | Laroia et al. | 455/422.1 |
| 2007/0104101 A1* | 5/2007 | Sadr | 370/230 |
| 2007/0105576 A1 | 5/2007 | Gupta et al. | |
| 2008/0080553 A1* | 4/2008 | Hasty et al. | 370/468 |
| 2008/0192752 A1* | 8/2008 | Hyslop et al. | 370/395.21 |

FOREIGN PATENT DOCUMENTS

| | | |
|---|---|---|
| CN | 101150512 A | 3/2008 |
| KR | 20060092811 A | 8/2006 |
| WO | WO9706622 A1 | 2/1997 |
| WO | 2008021790 | 2/2008 |

OTHER PUBLICATIONS

Yuan Sun et al: "Model-based resource prediction for multi-hop wireless networks" Mobile Ad-Hoc and Sensor Systems, 2004 IEEE International Conference 0 N Fort Lauderdale, FL, USA Oct. 25-27, 2004, Piscataway, NJ, USAJEEE, US, Oct. 25, 2004, pp. 114-123, XP010765221 ISBN: 978-0-7803-8815-4 p. 114, left-hand column, paragraph 3 p. 120, left-hand column, line 14—p. 121, left-hand column, line 7.

Chen S., et al.,"Localized algorithm for aggregate fairness in wireless sensor networks", MobiCom '06 Proceedings of the 12th annual international conference on Mobile computing and networking, pp. 274-285, 2006.

Taiwan Search Report—TW098112562—TIPO—Sep. 25, 2012.

\* cited by examiner

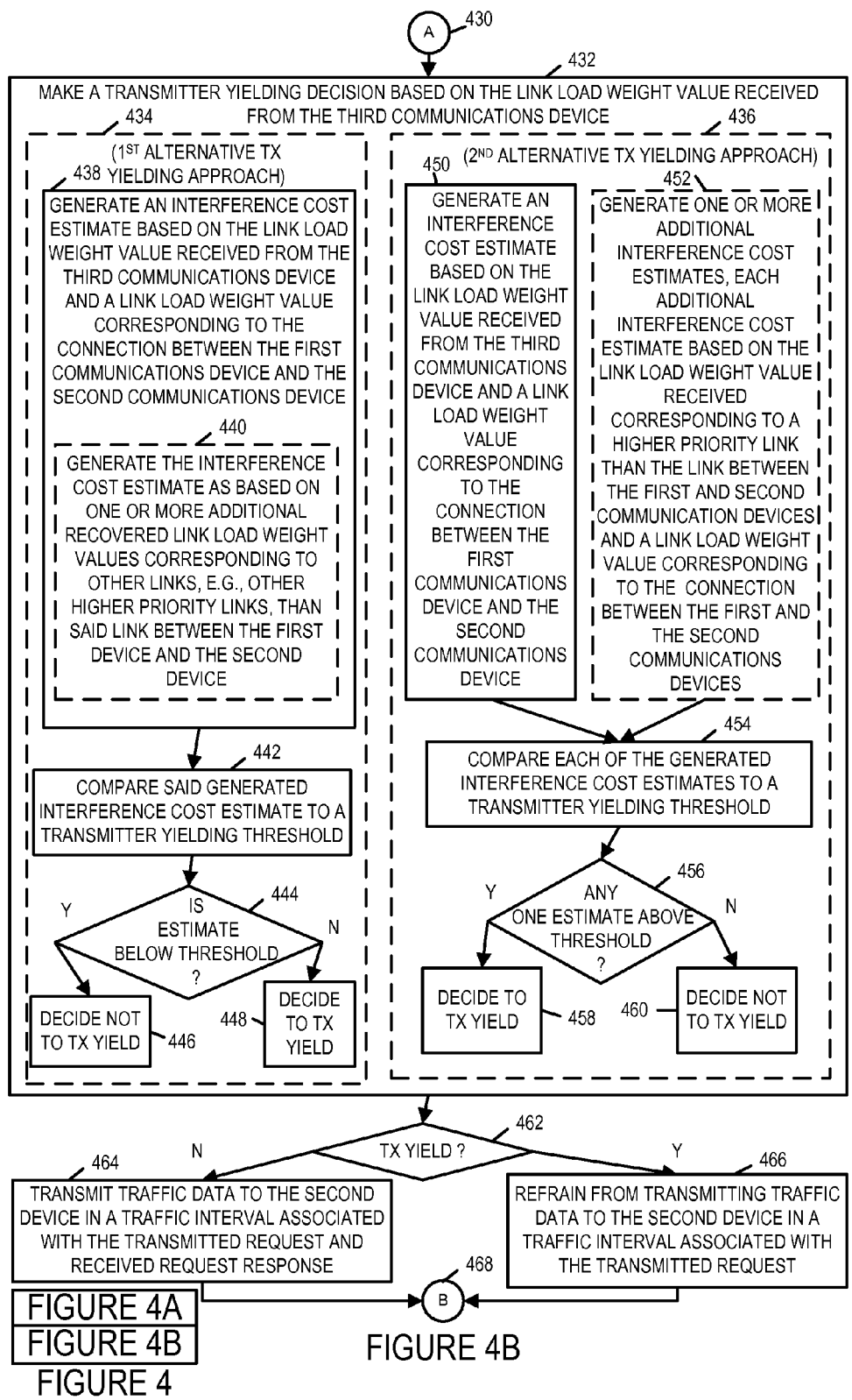

METHODS AND APPARATUS FOR COMMUNICATING AND/OR USING LOAD INFORMATION IN SUPPORT OF DECENTRALIZED TRAFFIC SCHEDULING DECISIONS

RELATED APPLICATIONS

The present application for patent claims priority to Provisional Application Ser. No. 61/045,030 entitled "NOTES ON LOAD-SPILLAGE BASED LINK SCHEDULING MECHANISM" filed Apr. 15, 2008, and assigned to the assignee hereof and hereby expressly incorporated by reference herein.

FIELD

Various embodiments relate to wireless communications, and more particularly, to methods and apparatus related to peer to peer communications.

BACKGROUND

In wireless communications networks lacking centralized control efficient scheduling of traffic air link resources can be a difficult task. An approach of allocating each connection the same weighting or the same amount of air link traffic resources although simple in design tends to be wasteful. At different times, a particular communications device or pair of devices corresponding to a connection may have different needs, e.g., due to: the type of data to be communicated, importance of data to be communicated, latency considerations, backlog, queue status, current channel conditions, congestion, application being executed, etc. Different types of devices may also have different device capabilities, e.g., different traffic queue buffer sizes, different display capabilities, etc. The same device may also have different needs at different times based on the capabilities of the other device with which it has a current connection. Thus at different times the importance of a particular device being allowed to use a traffic segment may be expected to vary.

If distributed scheduling techniques are employed for traffic scheduling it can be beneficial for the individual devices making the scheduling decisions to be situationally aware of the current needs of other devices competing to use the same resources. In view of the above there is a need for novel methods and apparatus which support the exchange of load related information between communications devices situated in a vicinity which are competing to use the same air link traffic resources. Since utilization of air link resources for control signaling tends to make those air link resources unavailable for traffic signaling, it would be advantageous if such methods and apparatus efficiently structured the control signaling to tend to minimize overhead.

SUMMARY

Methods and apparatus relating to scheduling of air link resources, e.g., traffic segments, in a wireless communications system are described. Various described methods and apparatus are well suited to wireless peer to peer networks in which traffic scheduling is decentralized, e.g. an ad hoc peer to peer network. In some embodiments individual wireless terminals corresponding to a peer to peer connection which desire to communicate traffic signals make transmitter yielding and/or receiver yielding decisions on a traffic slot by traffic slot basis. Loading information is used to intentionally skew transmitter yielding decisions in response to conditions and/or needs in the system.

A link load weight value is generated based on intended transmitter loading related information and/or intended receiver loading related information. One feature of various embodiments includes the communication of traffic request parameters and/or link load weight values between wireless communications devices as part of the scheduling signaling. In some embodiments, a traffic transmission request signal conveys a link load weight value or one or more traffic request parameters used to derive a link load weight value. In some embodiments, a traffic transmission request response signal includes a link load weight value. The inclusion the link load weight value in the traffic transmission request response signal facilitates the recovery of link load weighting values by a plurality of different devices which may have different channel conditions with respect to the transmitter of the request response signal. The different devices may benefit from utilizing the recovered link load weight values in making a transmitter yielding decision regarding traffic signaling in a traffic segment, wherein the transmitter yielding decision takes into consideration loading information.

In some embodiments, as part of a transmitter yielding decision, one or more of: a spillage value, weighted SINR, and an interference cost estimate is calculated based on: one or more link load weight values and channel condition measurement information.

An exemplary method of operating a first communications device, in accordance with some embodiments, comprises: receiving a transmission request from a second communications device; generating a link load weight value; and transmitting, in response to the transmission request from the second communications device, a transmission request response including said link load weight value. An exemplary first communications device, in accordance with some embodiments, comprises: at least one processor configured to: receive a transmission request from a second communications device, generate a link load weight value, and transmit, in response to the transmission request from the second communications device, a transmission request response including said link load weight value; and a memory coupled to the at least one processor.

An exemplary method of operating a first communications device, in accordance with some embodiments, comprises: receiving a request response from a second communications device which is in response to a transmission request from said first communications device; receiving a first link load weight value from a third communications device; making a transmitter yielding decision based on the link load weight value received from the third communications device. An exemplary first communications device, in accordance with some embodiments, comprises: at least one processor configured to: receive a request response from a second communications device which is in response to a transmission request from said first communications device; receive a first link load weight value from a third communications device; and make a transmitter yielding decision based on the first link load weight value received from the third communications device.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
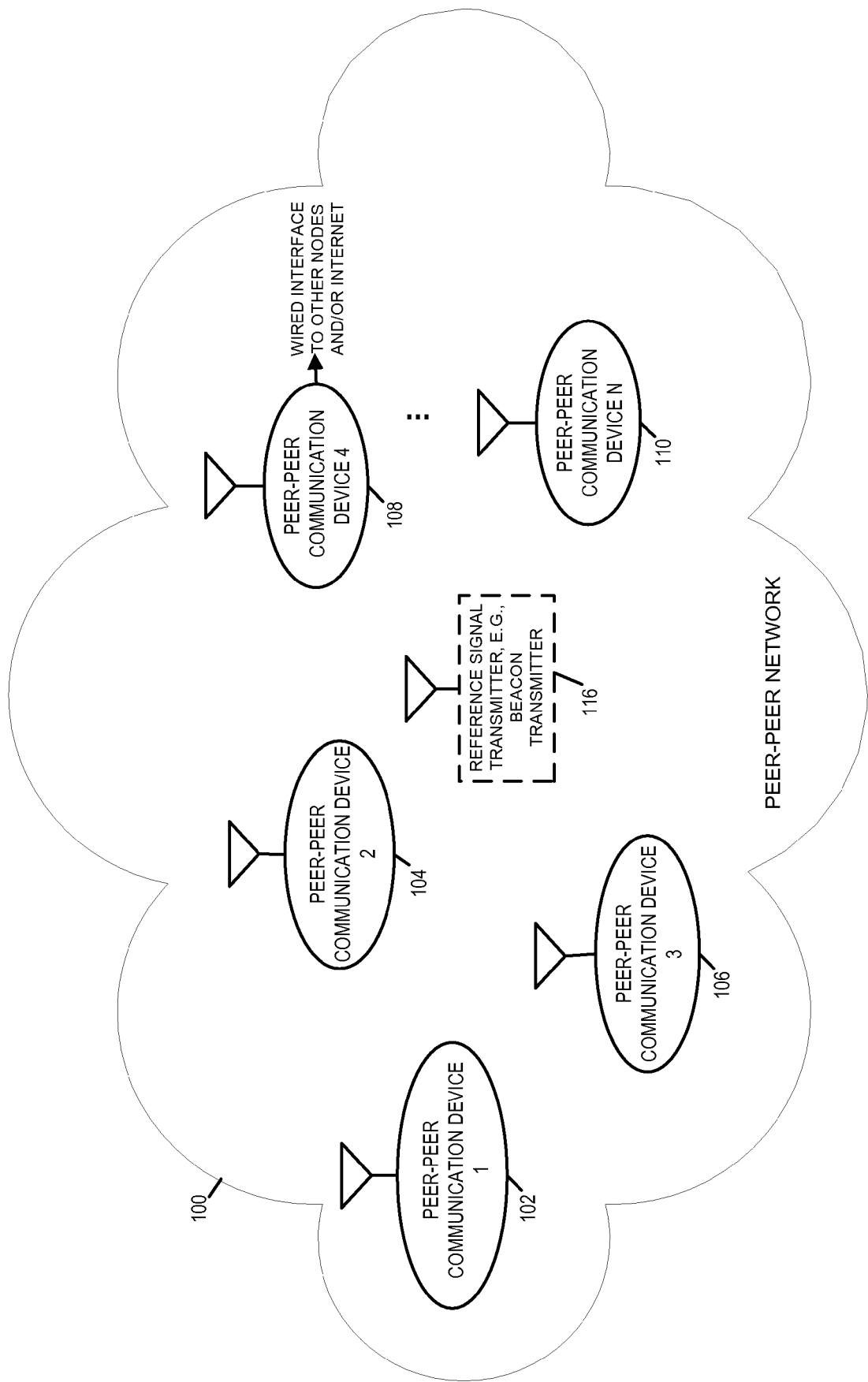
FIG. 1 is a drawing of an exemplary peer to peer network, e.g., an adhoc communications network, in accordance with an exemplary embodiment.

FIG. 1 is a drawing of an exemplary peer to peer network 100, e.g., an ad-hoc communications network, in accordance with an exemplary embodiment. The exemplary network supports peer to peer traffic signaling by communication devices, e.g., mobile wireless terminals. The exemplary network 100 supports decentralized scheduling of traffic air link resources, e.g., segments, on a slot by slot basis. In some embodiments, the scheduling is based on load information corresponding to different connections competing to use the same traffic air link resource. Exemplary peer to peer network 100 includes a plurality of wireless devices (peer to peer communications device 1 102, peer to peer communications device 2 104, peer to peer communications device 3 106, peer to peer communications device 4 108, . . . , peer to peer communications device N 110) supporting peer to peer traffic signaling. In some embodiments, the network 100 includes a reference signal transmitter 116, e.g., a beacon transmitter. The wireless devices (102, 104, 106, 108, . . . , 110) in the communications network 100 can establish connections with one another, e.g., peer to peer connections, generate and transmit traffic transmission request signals, e.g., a traffic request signal conveying a link load weight value or a traffic request signal conveying one or more traffic request parameters used to derive a link load weight value, receive and process traffic transmission request signals, make receiver yielding decisions, generate and transmit traffic transmission request response signals, e.g., request response signals conveying link load weight values, receive and process traffic transmission request response signals, make transmitter yielding decisions, receive peer to peer traffic signals, and transmit peer to peer traffic signals. There is a recurring timing structure used in the network 100. In some embodiments a reference signal, e.g., an OFDM beacon signal from reference signal transmitter 116, is used by a wireless device to synchronize with respect to the timing structure. Alternatively, a signal used to synchronize with the timing structure may be sourced from another device, e.g., a GPS transmitter, a base station or another peer to peer device. The timing structure used in the network includes a plurality of individual traffic slots.

Figure 2:
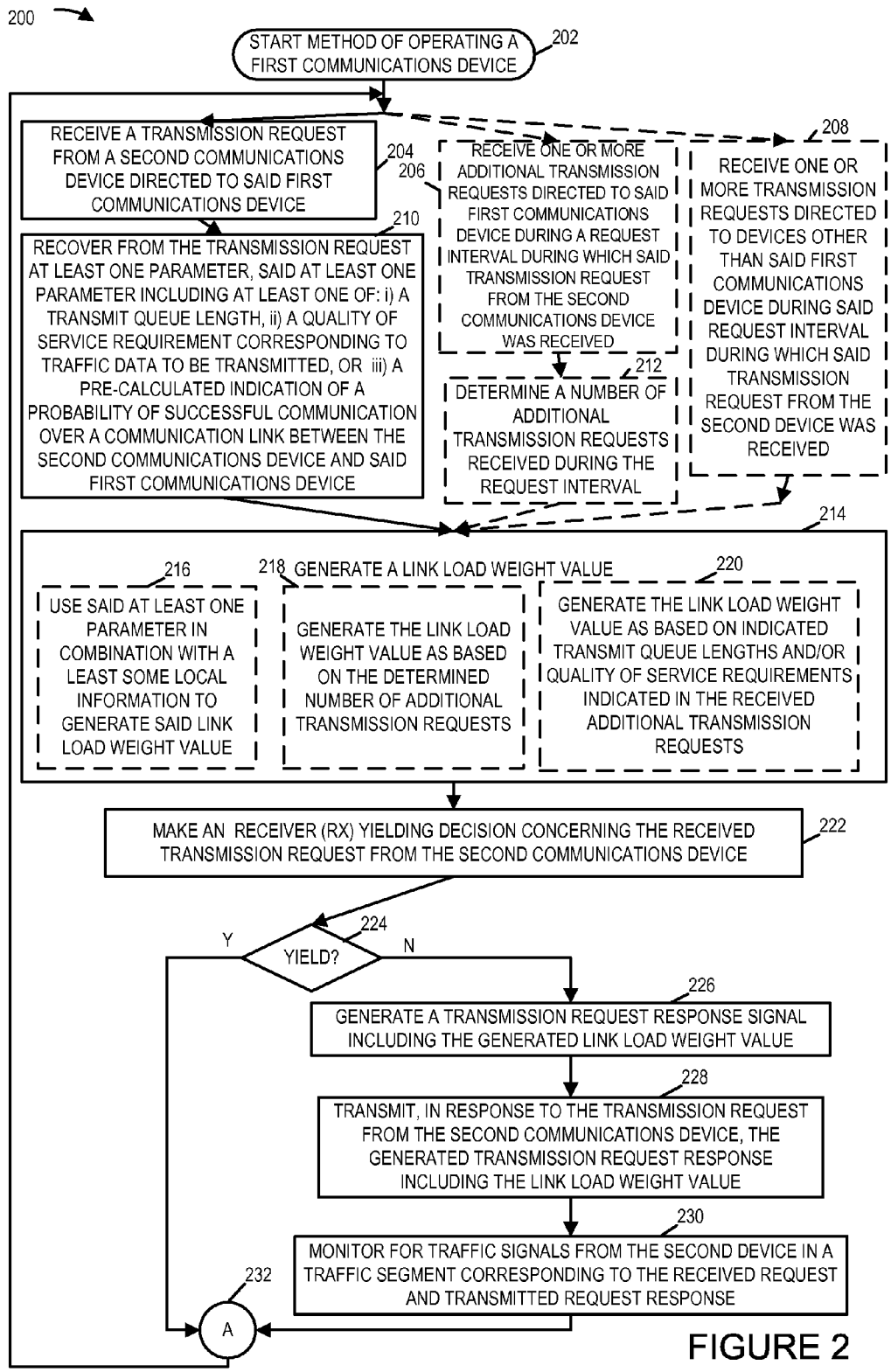
FIG. 2 is a flowchart of an exemplary method of operating a first communications device, e.g., a peer to peer mobile wireless terminal, in accordance with an exemplary embodiment.

FIG. 2 is a flowchart 200 of an exemplary method of operating a first communications device, e.g., a peer to peer mobile wireless terminal, in accordance with an exemplary embodiment. Operation of the exemplary method starts in step 202 where the first communications device is powered on and initialized, and establishes one or more peer to peer connections, e.g., a connection with a second communications device. Operation proceeds from step 202 to step 204. Operation may, and sometimes does, also proceed from step 202 to one or more of steps 206 and 208.

In step 204 the first communications device receives a transmission request from the second communications device directed to said first communications device. Operation proceeds from step 204 to step 210. In step 210 the first communications device recovers from the received transmission request of step 204 at least one parameter, said at least one parameter including at least one of: i) a transmit queue length, ii) a quality of service requirement corresponding to traffic data to be transmitted, or iii) a pre-calculated indication of a probability of successful communication over a communication link between the second communications device and said first device. Transmit queue length is, e.g., information indicating the amount of data in a transmit queue corresponding to a transmit request. Quality of service requirement information is, e.g., information indicating a data rate, latency information, and/or traffic type. Operation proceeds from step 210 to step 214.

Returning to step 206, in step 206 the first communications device receives one or more additional transmission requests directed to the first communications device during a transmission request interval during which the transmission request from the second communications device was received. Then in step 212, the first communications device determines the number of additional transmission requests received during the request interval which are directed to the first communications device. Operation proceeds from step 212 to step 214.

Returning to step 208, in step 208 the first communications device receives one or more transmission requests directed to devices other than the first communications device during the request interval during which the transmission request from the second communications device was received. Operation proceeds from step 208 to step 214.

In step 214 the first communications device generates a link load weight value which is a weight to be used in making a transmission yielding decision. In some embodiments, step 214 includes one or more of sub-steps 216, 218 and 220. In sub-step 216 the first communications device uses said at least one parameter, which was recovered in step 210, in combination with at least some local information to generate said link load weight value. Local information includes, e.g., unused and/or used receive buffer capacity, device display capacity, and/or determined priority of links corresponding to other devices requesting to communicate with the device. In sub-step 218 the first communications device generates the link load weight value based on the number of determined number of additional transmission requests directed to the first communications device. For example, a higher link load weight value is determined for a larger number of received additional transmission requests. In sub-step 220 the first communications device generates the link load weight value based on indicated transmit queue lengths and/or quality of service requirements indicated in the received additional transmission requests directed to the first communications device. For example, a higher generated link load value is generated for larger queue length by the additional transmission requests. As another example, a higher generated link load value is generated from stricter quality of service requirements by the additional transmission requests. By using a higher link load value under such a situation, it can increase the probability of serving the current transmission request and make way for the additional transmission requests directed to the first communications device to be serviced in subsequent data transmission intervals. Operation proceeds from step 214 to step 222.

In step 222 the first communications device makes a receiver (RX) yielding decision concerning the received transmission request from the second communications device. Operation proceeds from step 222 to step 224. If the decision of step 222 was to yield then operation proceeds from step 224 to connecting node A 232. However, if the decision of step 222 was not to RX yield, then operation proceeds from step 224 to step 226.

In step 226 the first communications device generates a transmission request response signal including the generated link load weight value. Then, in step 228, the first communications device transmits, in response to the transmission request from the second communications device of step 204, the generated transmission request response including the generated link load weight value. Operation proceeds from step 228 to step 230.

In step 230 the first communications device monitors for traffic signals from the second communications device in a traffic segment corresponding to the received request and transmitted request response. Operation proceeds from step 230 to connecting node A 232. Operation proceeds from connecting node A 232 to the input of steps 204, 206 and 208, where operations are performed corresponding to another data transmission interval, e.g., another traffic slot in the timing structure.

Figure 3:
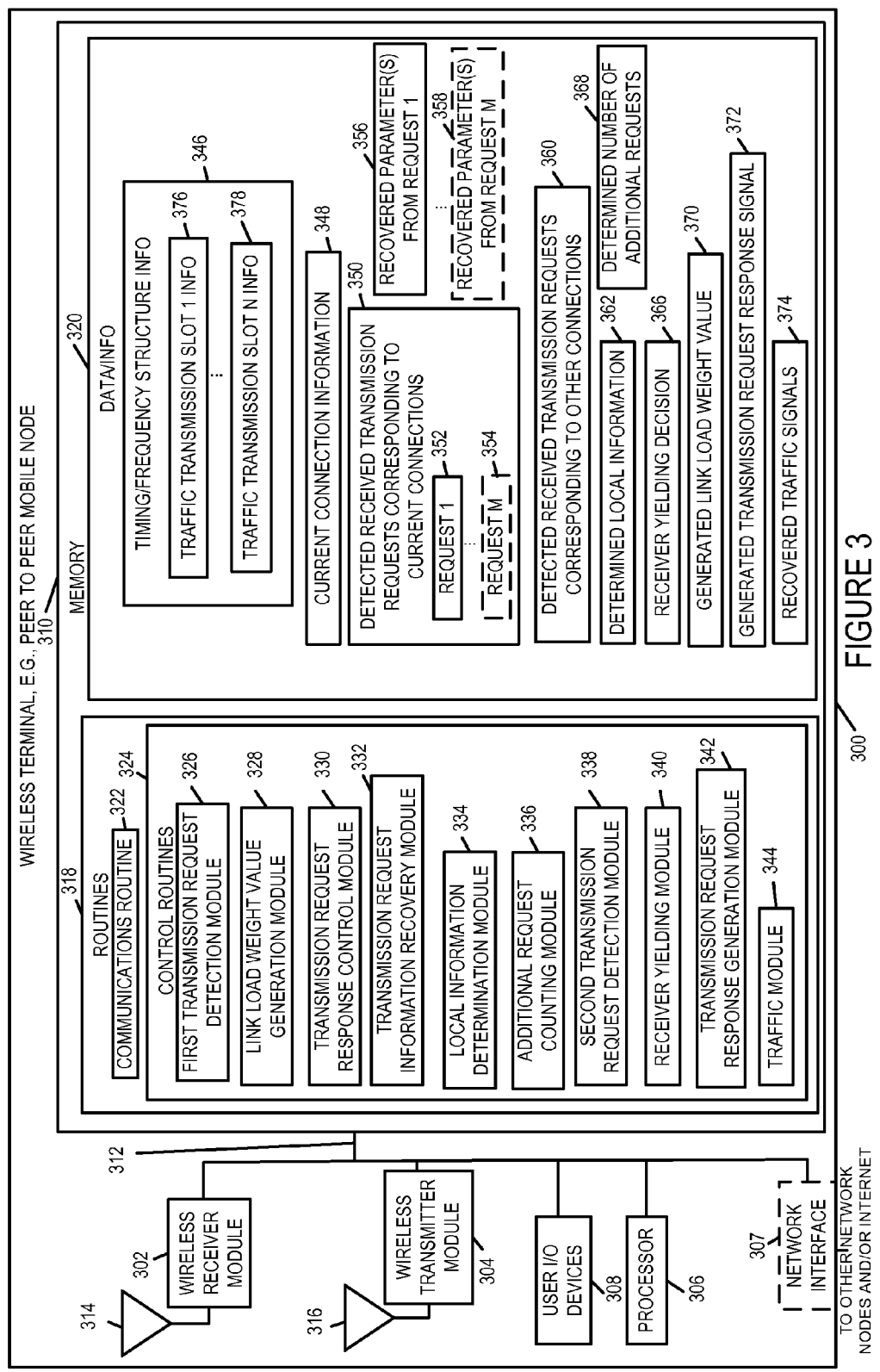
FIG. 3 is a drawing of an exemplary wireless terminal, e.g., a peer to peer mobile node, in accordance with an exemplary embodiment.

FIG. 3 is a drawing of an exemplary wireless terminal 300, e.g., a peer to peer mobile node, in accordance with an exemplary embodiment. Wireless terminal 300 is, e.g., one of the peer to peer communications devices of FIG. 1. Exemplary wireless terminal 300 includes a wireless receiver module 302, a wireless transmitter module 304, a processor 306, user I/O device 308 and a memory 310 coupled together via a bus 312 over which the various elements may interchange data and information. In some embodiments, wireless terminal 300 also includes network interface 307 which is also coupled to bus 312. Network interface 307, when included, couples the wireless terminal 300 to network nodes and/or the Internet, e.g., via a backhaul network. Memory 310 includes routines 318 and data/information 320.

User I/O devices 308 include, e.g., keyboard, keypad, mouse, switches, microphone, camera, display, speaker, etc. User I/O devices 308 allow an operator of wireless terminal 300 to input data/information, access output data/information and control at least some functions of wireless terminal 300. Processor 306, e.g., a CPU, executes the routines 318 and uses the data/information 320 in memory 310 to control the operation of the wireless terminal 300 and implement methods, e.g., the method of flowchart 200 of FIG. 2.

Wireless receiver module 302, e.g., an OFDM and/or CDMA receiver, is coupled to receive antenna 314 via which the wireless terminal 300 receives signals from other wireless communications devices. Received signals include, e.g., connection establishment signals, connection maintenance signals, transmission request signals conveying parameters used to derive link load weight values, and traffic segment signals. Wireless receiver module 302 may, and sometimes does, receive a transmission request signal from a second device with which the wireless terminal 300 has a current connection. Wireless receiver module 302 may, and sometimes does, receive additional transmission requests, corresponding to other connections of which wireless terminal 300 is a member, during the same request interval during which the request signal from the second device was received. Wireless receiver module 302 may, and sometimes does, also receive transmission requests corresponding to connections of which wireless terminal 300 is not a member during the same request interval during which the request from the second device was received.

Wireless transmitter module 304, e.g., an OFDM and/or CDMA transmitter, is coupled to transmit antenna 316 via which the wireless terminal 300 transmits signals to other wireless communications devices. Transmitted signals include, e.g., connection establishment signals, connection maintenance signals, and a transmission request response signal conveying a link load weight value. In some embodiments, the same antenna is used for receiver and transmitter.

Routines 318 include a communications routine 322 and control routines 324. The communications routine 322 implements the various communications protocols used by the wireless terminal 300. The control routines 324 include a first transmission request detection module 326, a link load weight value generation module 328, a transmission request response control module 330, a transmission request information recovery module 332, a local information determination module 334, an additional request counting module 336, a second transmission request detection module 338, a receiver yielding module 340, a transmission request response generation module 342, and a traffic module 344.

Data/information 320 includes timing/frequency structure information 346, current connection information 348, detected received transmission requests corresponding to current connections 350, recovered parameters corresponding to one or more of the detected requests of current connections (recovered parameter(s) from request 1 356, . . . , recovered parameter(s) from request M 358), detected received transmission requests corresponding to other connections 360, determined local information 362, determined number of additional requests 368, a receiver yielding decision 366, a generated link load weight value 370 a generated transmission request response signal 372, and recovered traffic signals 374. Detected received transmission requests corresponding to current connections 350 includes detected received transmission requests for the same slot corresponding to one or more connections of which wireless terminal 300 is a member (request 1 352, . . . , request M 354). Timing/frequency structure information 346 includes information corresponding to a plurality of traffic transmission slots (traffic transmission slot 1 information 376, . . . , traffic transmission slot N information 378). Each traffic transmission slot information includes, e.g., information identifying scheduling air link resources such as traffic transmission request air link resources and traffic transmission request response air link resources; information identifying traffic data rate related air link resources; and information identifying traffic segment and traffic acknowledgement air link resources.

First transmission request detection module 326 detects a received transmission request corresponding to current connections of wireless terminal 300. For example first transmission request detection module 326 detects a received transmission request from a second device with which device 300 has a current connection. First transmission request detection module 326 may, and sometimes does, detect transmission requests corresponding to other connections of wireless terminal 300 during a request interval during which the transmission request from the second device was received. Detected received transmission requests corresponding to current connections 350 is an output of first transmission request detection module 326.

Link load weight value generation module 328 generates a link load weight value which is to be used in making a transmission yielding decision, e.g., by a device which previously transmitted a transmission request signal. Generated link load weight value 370 is an output of module 328, used as an input by transmission request response generation module 342, and conveyed via a generated transmission request response signal 372.

Transmission request response control module 330 controls to wireless transmitter module 304 to transmit, in response to a received transmission request from a device with which device 300 has a current connection, e.g., a second device, a transmission request response signal including a generated link load weight value. For example, corresponding to a received transmission request from the second device, e.g., request 1 352, receiver yielding module 340 decides not to yield, and then transmission request response control module 330 controls wireless transmitter module 304 to transmit generated transmission request response signal 372, e.g., an RX echo signal signifying a positive response to the received request 352, and the generated transmission request response signal 372 conveys generated link load weight value 370. In some embodiments, the transmission request response control module 330 controls the wireless transmitter module 304 to refrain from transmitting a request response signal on a request response air link resource associated with the connection in response to a received transmission request associated with the connection when the decision of the receiver yielding module 340 is to yield with regard to that request.

Transmission request information recovery module 332 recovers from a received transmission request at least one parameter, said at least one parameter being one of: i) a transmission queue length, ii) a quality of service requirement corresponding to traffic data to be transmitted, and iii) a pre-calculated indication of the probability of successful communication over a communications link between the device which transmitted the request and device to which the request is directed. Transmission queue length is, e.g., a parameter indicating an amount of data in a transmission queue corresponding to the transmission request. A quality of service parameter is, e.g., a parameter indicating at least one of data rate, latency, and traffic type. Recovered parameter(s) from request 1 356 indicate parameter(s) recovered from request 1 352 by transmission request information recovery module 332, while recovered parameter(s) from request M 358 indicate parameter(s) recovered from request M 354 by module 332. Recovered parameters 356 and/or 358 are utilized as input by link load weight value generation module 328.

Local information determination module 334 determines local information. Local information includes, e.g., unused and/or unused receive buffer capacity, device display capability, and determined priority of links corresponding to other devices requesting to communicate with wireless terminal 300. Determined local information is an output of local information determination module 334 and used as an input to link load weight value generation module 328. In some embodiments, the link load weight value generation module 328 generates a link load weight value using at least one recovered parameter in combination with at least some local information, e.g., recovered parameter from request 1 356 and determined local information 362. In this way, a generated link load weight value is based on both transmit device input and receive device input.

Additional request counting module 336 determines a number of additional transmission requests received during the same request interval which are directed to wireless terminal 300. For example, in a request interval for a traffic slot wireless terminal 300 may have received a transmission request from a second device corresponding to a first connection of wireless terminal 300 and may have also received transmission requests corresponding one or more additional connections of wireless terminal 300, where the first connection may have the highest priority. Additional counting module 336 counts the number of additional received requests directed to wireless terminal 300 for the same request interval, obtaining determined number of additional requests 368. Determined number of additional requests 368 is used as an input by link load weight generation module 328. In some embodiments, the link load weight value generation module 328 generates a link load weight value based on the determined number of additional transmission requests. In one embodiment, the link load weight value generation module 328 generates a higher link load weight value for a larger number of received additional transmission requests given that other input conditions remain constant.

In some embodiments, the link load weight value generation module 328 generates a link load weight value based on: an indicated transmit queue length and a quality of service requirement indicated in a received additional transmission request. In some embodiments, a higher link load weight value is generated for a larger queue length by an additional transmission request, given other input conditions are constant. In some embodiments, a higher link load weight value is generated for stricter quality of service requirements by an additional transmission request, given other input conditions are constant. In some embodiments, a higher link load weight value is generated for a larger queue length and stricter quality of service requirements by an additional transmission request, given other input conditions are constant. In some embodiments the received additional requests in the same request interval directed to wireless terminal 300 are treated as an ensemble and queue length information and quality of service requirements corresponding to each of the received additional requests is used by the link load weight value generation module 328. In some embodiments, the link load weight value generation module 328 generates a higher generated link load weight value for larger queue length and stricter quality of service communicated by the additional one or more transmission requests, other inputs remaining constant. By increasing the link load weight value in a request response, one can, and sometimes does, increase the probability of serving the current corresponding transmission request. Thus one can make way for the additional transmission requests in subsequent data transmission intervals.

Second transmission request detection module 338 detects received transmission requests corresponding to connections of which wireless terminal 300 is not a member. Detected received transmission requests corresponding to other connections 360 is an output of module 338.

Receiver yielding module 340 makes a receiver yielding decision for a current connection based on the received transmission request corresponding to the current connection and received higher priority transmission requests corresponding to other connections of which wireless terminal 300 is not a member. For example, receiver yielding module 340 makes a receiver yielding decision based on priority information corresponding to the received requests and received power level information corresponding to the received requests. For example, receiver yielding module 340 makes a decision whether or not to yield a traffic transmission segment based on an estimated SINR if it allows the intended traffic transmission to proceed. Receiver yielding decision 366 is an output of module 340 and used as an input by transmission request response control module 330 and/or transmission request response generation module 342.

Transmission request response generation module 342 generates a request response signal, e.g., signal 372, corresponding to a received transmission request directed to wireless terminal 300 when wireless terminal 300 decides not to yield with respect to that request. Transmission request response generation module 342 includes a generated link load weight value in the generated transmission request response signal. In some embodiments, the link load weight value is communicated via phase on an OFDM modulation symbol. In some embodiments, the link load weight value is communicated via phase and amplitude on an OFDM modulation symbol.

Traffic module 344 processes received traffic signals directed to wireless terminal 300 on a traffic segment corresponding to a transmitted generated transmission request response signal. Recovered traffic signals 374 is an output of traffic module 344. The recovered traffic signals are, e.g., peer to peer traffic signals conveying image data, audio data, and/or other file data.

Figure 4A:
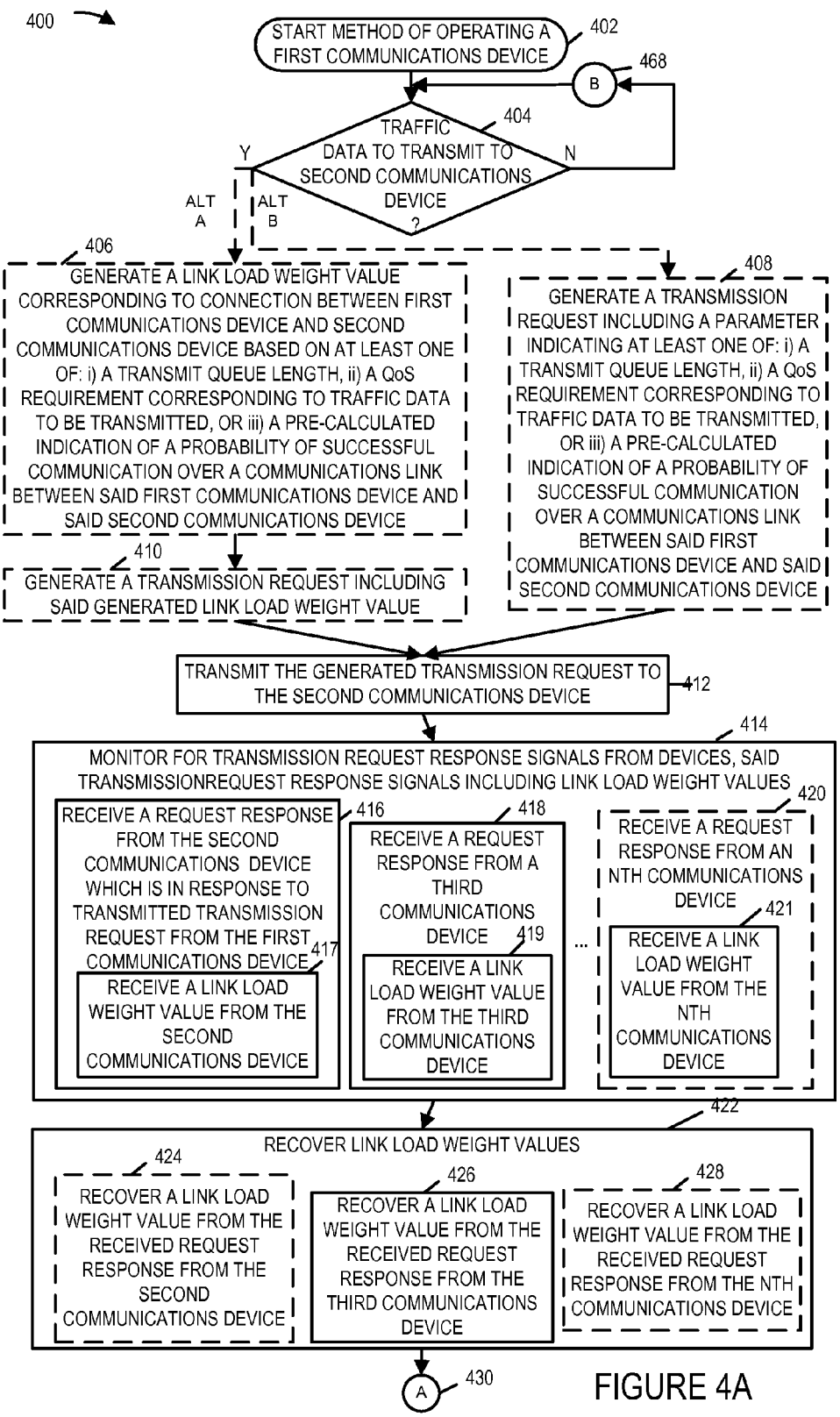
FIG. 4, comprising the combination of FIG. 4A
FIG. 4B is a flowchart of an exemplary method of operating a first communications device, e.g., a peer to peer mobile wireless terminal in a peer to peer communications system.

FIG. 4, comprising the combination of FIG. 4A and FIG. 4B, is a flowchart 400 of an exemplary method of operating a first communications device, e.g., a peer to peer mobile wireless terminal in a peer to peer communications system. Operation of the exemplary method starts in step 402 where the first communications device is powered on and establishes a peer to peer connection with a second communications device. Operation proceeds from start step 402 to step 404.

In step 404 the communications device determines whether or not it has data to transmit to the second communications device. If the first communications device decides that it has data to transmit to the second communications device, then operation proceeds from step 404 to step 406 or step 408, depending upon the particular implemented embodiment. If the first communications device decides that it does not have traffic data to transmit to the second communications device, then operation proceeds from the output of step 404 via connecting node B 468 to the input of step 404 for a determination to be made for a subsequent data slot.

Consider that the peer to peer communications system is utilizing the alternative A implementation of steps 406 and 410. In step 406 the first communications device generates a link load weight value corresponding to the connection between the first communications device and the second communications device based on at least one of: a transmit queue length, ii) a QoS requirement corresponding to traffic data to be transmitted, or iii) a pre-calculated indication of a probability of successful communication over a communications link between the first communications device and the second communications device. The transmit queue length is, e.g. information indicating the amount of data in a transmit queue corresponding to the transmit request. Examples of QoS requirements are data rate, latency and traffic type which may be considered alone or in combination. Then in step 410 the first communications device generates a transmission request include the generated link load weight value from step 406. Operation proceeds from step 410 to step 412.

Now alternatively consider that the peer to peer communications system is utilizing the alternative B implementation of step 408. In step 408 the first communications device generates a transmission request including a parameter indicating at least one of: i) a transmit queue length, ii) a quality of service (QoS) requirement corresponding to data to be transmitted, or iii) a pre-calculated indication of a probability of successful communication over a communications link between the first communications device and the second communications device. The transmit queue length is, e.g. information indicating the amount of data in a transmit queue corresponding to the transmit request. Examples of QoS requirements are data rate, latency and traffic type which may be considered alone or in combination. Operation proceeds from step 408 to step 412.

In step 412 the first communications device transmits the generated transmission request to the second communications device. Then in step 414 the first communications device monitors for transmission request response signals from devices, the transmission request response signals including link load weight values. Step 414 includes sub-steps 416 and sub-step 418 and may include sub-step 420. In sub-step 416 the first communications device receives a request response from the second communications device which is in response to the transmitted transmission request from the first communications device of step 412. Sub-step 416 includes sub-step 417 in which the first communications device receives a link load weight value from the second communications device. In step 418 the first communications device receives a request response from a third communications device. Sub-step 418 includes sub-step 419 in which the first communications device receives a link load weight value from the third communications device. In step 420 the first communications device receives a request response from an Nth communications device. Sub-step 420 includes sub-step 421 in which the first communications device receives a link load weight value from the Nth communications device. Operation proceeds from step 414 to step 422.

In step 422 the first communications device recovers link load weight values. Step 422 includes sub-step 426 and may include one or more of sub-steps 424 and 428. In sub-step 426 the first communications device recovers a link load weight value from the received request response from the third communications device. In some embodiments, the implementation is such that the link load weight value communicated in the received request of step 416 is an echo the generated link load weight value of step 406 communicated in the corresponding transmission request. In some such embodiments, the first communications device has generated the link load weight value in step 406, stores the generated link load weight value and has the stored value available, so sub-step 404 need not be performed. In some other embodiments, in which the first communications device generates a link load value in step 406 and transmits the generated link load weight value in the transmission request, the intended receiver of the transmission request may, and sometimes does, change the link load weight value, e.g., based on local information. In such an embodiment sub-step 424 is performed. In embodiments, in which step 408 is performed, sub-step 424 is performed since the link load weight values are generated by intended receiver devices.

Sub-step 428 of step 422 is performed when sub-step 420 of step 414 is performed. In sub-step 428 the first communications device recovers a link load weight value from the received request response from the Nth communications device. Operation proceeds from step 422 via connecting node A 430 to step 432.

In step 432 the first communications device makes a transmitter yielding decision based on the link load weight value received from the third communications device. Two alternative transmitter yielding approaches are illustrated. Block 434 represents a first alternative transmitter yielding approach in which an interference cost estimate is generated based on an aggregate of information corresponding to multiple connections and the single estimate is compared to a threshold. Block 436 represents a second alternative transmitter yielding approach in which one or more individual interference cost estimates are determined and each individual cost estimate is compared to a threshold.

Block 434 includes steps 438, 442, 444, 446 and 448. In step 438 the first communications device generates an interference cost estimate based on the link load weight value from the third communications device and a link load weight value corresponding to the connection between the first communications device and the second communications device. In some embodiments, generating an interference cost estimate includes calculating a spillage value based on the link load weight value received from the third communications device and a channel measurement value generated from a measurement of a channel between the third communications device and the first communications device. In some embodiments, step 438 includes sub-step 440 in which the first communications device generates the interference cost estimate based on other links, e.g., other higher priority links, than the link between the first communications device and the second communications device. In some such embodiments generating an interference cost estimate includes generating a spillage aggregate corresponding to higher priority links than the link between the first communications device and the second communications device. In some embodiments, generating an interference cost estimate includes generating a spillage aggregate corresponding to a set of other links from which request response were detected said set of other links including connections in which the first device does not participate. For example, the set of other links is the set of links other than the link between the first and second communications device from which a request response signal above a minimum level was detected. Operation proceeds from step 434 to step 442. In step 442, the first communications device compares the generated interference cost estimate of step 438 to a transmitter yielding threshold. Various approaches to thresholds are possible and different approaches are used in different alternative embodiments. In some embodiments, a fixed value is used for the threshold. In some embodiments, a threshold value is set based on historical data for an average experienced data rate. In various embodiments, a threshold value is set based on delay information, e.g., a threshold value is set based on an average scheduling delay. In some embodiments, the threshold is varied between a plurality of alternative fixed values, e.g., cyclically varied between two fixed values.

Then in step 444, if the comparison of step 442 determines that the generated interference cost estimate of step 438 is below the threshold, operation proceeds from step 444 to step 446, where the first communications device decides not to transmitter yield. However, if the comparison of step 442 determines that the generated interference estimate is not below the threshold, then operation proceeds from step 444 to step 448 where the first communications device decides to transmitter yield.

Returning to block 436, block 436 includes steps 450, 454, 456, 458 and 460. In step 450 the first communications device generates an interference cost estimate based on the link load weight value received from the third communications device and a link load weight value corresponding to the connection between the first communications device and the second communications device. Bock 436 may, and sometimes does, include step 452. In step 452 the first communications device generates one or more additional interference cost estimates, each additional interference cost estimate based on the link load weight value received corresponding to a higher priority link than the link between the first and second communications devices and a link load weight value corresponding to the link between the first and second communications devices. In this alternative TX yielding approach of block 436 individual interference cost estimates are determined corresponding to each higher priority link than the link between the first and second communications device. In some such embodiments, generating an individual interference cost estimate includes calculating a individual spillage value using the link load weight value received from the communications device of the other higher priority link under consideration and a channel measurement value generated from a measurement of the channel between the device of the other higher priority link which transmitted the link load weight value and the first communications device.

Operation proceeds from step 450 and step 452 to step 454. In step 454, the first communications device compares each of the generated interference cost estimates to a transmitter yielding threshold. Various approaches to thresholds are possible and different approaches are used in different alternative embodiments. In some embodiments, a fixed value is used for the threshold. In some embodiments, a threshold value is set based on historical data for an average experienced data rate. In various embodiments, a threshold value is set based on delay information, e.g., a threshold value is set based on an average scheduling delay. In some embodiments, the threshold is varied between a plurality of alternative fixed values, e.g., cyclically varied between two fixed values. In some embodiments, different thresholds are used for different links.

Then in step 456, if any of the estimates is above a yielding threshold, operation proceeds from step 456 to step 458, where the first communications device decides to transmitter yield. However if none of the interference costs estimates are above a threshold, then operation proceeds from step 456 to step 460, where the first communications device decides not to transmitter yield.

Operation proceeds from step 432 to step 462. In step 462, the first communications device proceeds based on the transmitter yielding decision of step 432. If the decision is not to TX yield, then operation proceeds from step 462 to step 464, in which the first communications device transmits traffic data to the second communications device in a traffic interval associated with the transmitted request of step 412 and the received request response of sub-step 416. However, if the decision of step 432 is to TX yield, then operation proceeds from step 462 to step 466, where the first communications device refrains from transmitting traffic data to the second communications device in a traffic interval associated with the transmitted request of step 412. Operation proceeds from step 464 or step 466 to step 404 via connecting node B 468, where the first communications device decides if it has data to transmit to the second communications device in another traffic slot.

Figure 5:
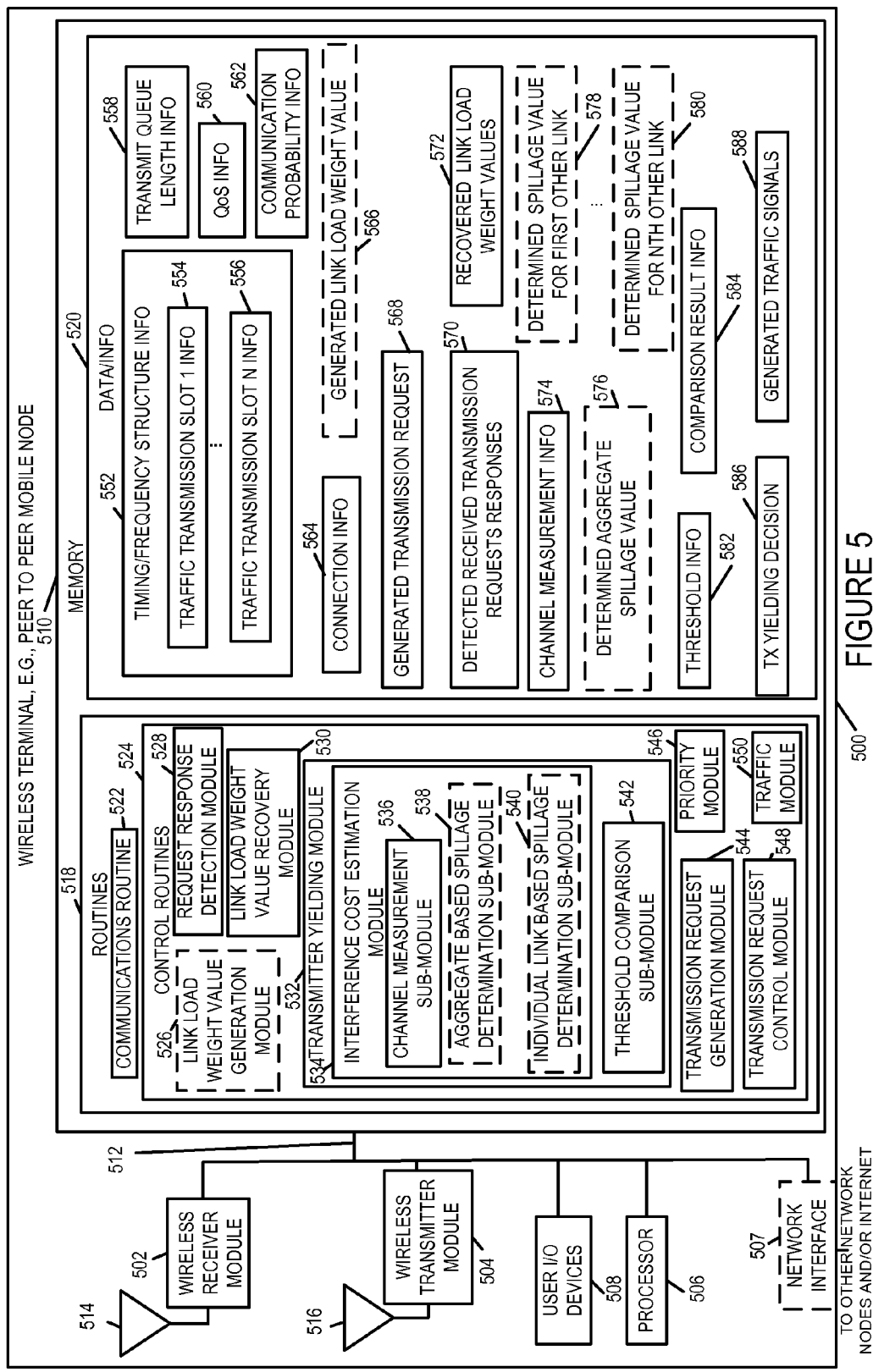
FIG. 5 is a drawing of an exemplary wireless terminal, e.g., a peer to peer mobile node, in accordance with an exemplary embodiment.

FIG. 5 is a drawing of an exemplary wireless terminal 500, e.g., a peer to peer mobile node, in accordance with an exemplary embodiment. Exemplary WT 500 is, e.g., one of the peer to peer communications device of FIG. 1. Exemplary wireless terminal 500 includes a wireless receiver module 502, a wireless transmitter module 504, a processor 506, user I/O devices 508 and a memory 510 coupled together via a bus 512 over which the various elements may interchange data and information. In some embodiments, wireless terminal 500 also includes a network interface 507 also coupled to bus 512, and the wireless terminal 500 can be coupled to a backhaul via network interface 507 allowing facilitating communication with network nodes and/or the Internet. User I/O device 508 include, e.g., keyboard, keypad, mouse, microphone, camera, switches, display, speaker, etc. User I/O devices 508 allow an operation of wireless terminal 500 to input data/information, access output data/information and control at least some function of the wireless terminal 500.

Memory 510 includes routines 518 and data/information 520. The processor 506, e.g., a CPU executes the routines 518 and uses the data/information 520 in memory 510 to control the operation of the wireless terminal 500 and implement methods, e.g., the method of flowchart 400 of FIG. 4.

Wireless receiver module 502, e.g., an OFDM and/or CDMA receiver, is coupled to receive antenna 514, via which wireless terminal 500 receives signals from other wireless devices. Received signals include, e.g., timing synchronization signals, connection establishment signals, connection maintenance signals and transmission request response signals. The transmission request response signals convey link load weight values. In some other embodiments a transmission request response is communicated in a different signal than a link load weight value, but the receiver module 502 receives both signals. Thus wireless receiver module 502 receives signals conveying request responses and link load weight values.

Wireless transmitter module 504, e.g., an OFDM and/or CDMA transmitter, is coupled to transmit antenna 516 via which the wireless terminal 500 transmits signals to other wireless devices. Transmitted signals include, e.g., connection establishment signals, connection maintenance signals, transmission request signals, and peer to peer traffic signals. In some embodiments, the same antenna is used for receiver and transmitter.

Routines 518 include a communications routine 522 and control routines 524. Communications routine 522 implements the various communications protocols used by the wireless terminal 500. Control routines 524 include a request response detection module 528, a link load weight value recovery module 530, a transmitter yielding module 532, a transmission request generation module 544, a priority module 546, a transmission request control module 548 and a traffic module 550. In some embodiments, control routines 524 also includes link load weight value generation module 526. Transmitter yielding module 532 includes interference cost estimation module 534 and threshold comparison sub-module 542. Interference cost estimation module 534 includes channel measurement sub-module 536. In some embodiments, e.g., an embodiment implementing the 1st alternative TX yielding approach of block 434 of flowchart 400 of FIG. 4, interference cost estimation module 534 includes aggregate based spillage determination sub-module 538. In some embodiments, e.g., an embodiment implementing the 2nd alternative TX yielding approach of block 436 of flowchart 400 of FIG. 4, interference cost estimation module 534 includes individual based spillage determination sub-module 540.

Data/information 520 includes timing/frequency structure information 520, transmit queue length information 558, quality of service (QoS) information 560, communication probability information 562, connection information 564, generated transmission request 568, detected received transmission request responses 570, recovered link load weight values 572, channel measurement information 574, threshold information 582, comparison result information 584, transmitter (TX) yielding decision 586 and generated traffic signals 588. In some embodiments, wireless terminal 500 generates a link load weight value corresponding a link of which it is a member, e.g., as part of transmission request signal generation. In such as embodiment, data/information 510 includes generated link load weight value 566. In some embodiments, e.g., an embodiment implementing the 1st alternative TX yielding approach of block 434 of flowchart 400 of FIG. 4, data/information 510 includes determined aggregate spillage value 576. In some embodiments, e.g., an embodiment implementing the 2nd alternative TX yielding approach of block 436 of flowchart 400 of FIG. 4, data/information 510 includes one or more of individual link determined spillage values (determined spillage value for first other link 578, . . . , determined spillage value for Nth other link 580).

Timing frequency structure information 552 includes information corresponding to plurality of traffic transmission slots in the recurring peer to peer timing structure (traffic transmission slot 1 information 554, . . . , traffic transmission slot N information 556). Traffic transmission slot 1 information 554 includes, e.g., information identifying air link resources used for peer to peer traffic scheduling including air link resources for conveying transmission requests and air link resources for conveying request response signals, and information identifying air link resources of a traffic segment. Connection information 564 includes information identifying current connections of wireless terminal 500 and information identifying air link resources, e.g., segments, in the timing/frequency structure associated with a connection identifier, e.g., specific traffic transmission request air link resources and specific transmission request response air link resources associated with a connection identifier currently held by wireless terminal 500. In some embodiments, the resources associated with a particular connection identifier change from one traffic transmission slot to the next in the timing/frequency structure, e.g., in accordance with a hopping sequence.

Request response detection module 528 detects received request response signals includes a received request response from a second device which is in response to a transmission request from the wireless terminal 500.

Link load weight value recovery module 530 recovers link load weight values from received signals including a link load weight value from a received signal from a third communication device. In some embodiments, link load weight values are communicated in request response signals. In some embodiments, the link load weight value from the third communications device is received in a transmission request response, e.g., corresponding to a link in which device 500 is not a member. In some embodiments, e.g., an embodiment not using link load weight value generation module 526, the link load weight value recovery module 530 also recovers a link load weight value from a second device corresponding to a connection of which device 500 is a member. In some embodiments, in which link load weight value generation module 526 is used, the device generating a request response to a received transmission request has the opportunity to alter a received link load weight value, e.g., based on local information, and communicate the altered link load weight value in the request response signal. In such an embodiment, the link load weight value recovery module 530 also recovers a link load weight value from a second device corresponding to a connection of which device 500 is a member. Recovered link load weight values 572 include information obtained by recovery module 530 which is used as input by the interference cost estimation module 534, aggregate based spillage determination sub-module 538 and/or individual link based spillage determination sub-module 540.

Transmitter yielding module 532 makes a transmitter yielding decision based on the link load weight value received from the third communications device. Transmitter yielding decision 586 is an output of transmitter yielding module 532 and is used as an input to traffic module 550. A decision to perform transmitter yielding is a decision not to proceed with an intended traffic transmission in the traffic slot, while a decision not to perform transmitter yielding is a decision to proceed with the intended traffic transmission in the traffic slot.

Link load weight value generation module 526 generates a link load weight value from at least one of: i) a transmit queue length, ii) a quality of service requirement corresponding to a transmission request, and iii) a pre-calculated indication of the probability of successful communication over a communication link between the second device and wireless terminal 500. Transmit queue length information 558, e.g., information indicating the amount of data in a transmit queue of wireless terminal 500 corresponding to a transmission request, QoS information 560, e.g., information indicating a data rate, latency information, and/or a traffic type, and communication probability information 562, e.g., information indicating a pre-calculated probability of successful communication over a communications link between wireless terminal 500 and the second communication device are inputs to link load weight value generation module 526 in embodiments using link load weight value generation module 526. Generated link load weight value 566 is an output of link load weight value generation module 526 and an input to transmission request generation module 544 in embodiments using link load weight value generation module 526. In alternative embodiments, in which link load weight value generation module 526 is not used, transmit queue length 558, QoS information 560 and communication probability information 562 are inputs to transmission request generation module 544.

Transmission request generation module 544 generates a transmission request, e.g., generated transmission request 568. In some embodiments, e.g., embodiments, using link load weight value generation module 526, the transmission request generation module 544 generates a transmission request including a generated link load weight value, e.g., value 566. In some embodiments, e.g., embodiments not including link load weight value generation module 526 a generated transmission request includes a parameter intended to be used by another device, e.g., the intended receiver of the transmission request, to generate a link load weight value. In some such embodiments, the transmission request generation module 544 generates a transmission request including a parameter or parameters indicating one or more of transmit queue length information 558, QoS information 560 and communication probability information 562. Generated transmission request 568 is an output of module 544 and an input to transmission request control module 548.

Transmission request control module 548 controls the wireless transmitter module 504 to transmit a generated transmission request to a second device, e.g., using air link resources associated with the connection between wireless terminal 500 and the second device.

Interference cost estimation module 534 generates an interference cost estimate based on the link load weight value received from a third communications device and a link load weight value corresponding to a connection between wireless terminal 500 and a second communications device. In some embodiments, the interference cost estimate is based on one or more spillage determinations. In some embodiments, the interference cost estimate is based on measured channel condition information, e.g., (i) a measured channel between a second device and wireless terminal 500 corresponding to a current connection of wireless terminal 500 and (ii) a measured channel between a third device and wireless terminal 500 corresponding to received detected transmission request response of a higher priority link between two devices of which wireless terminal 500 is not a member.

Threshold comparison sub-module 542 compares an interference cost estimate 534 to a threshold limit in threshold information 582. In some embodiments, e.g., an embodiment using an aggregate based spillage approach threshold comparison sub-module 542 makes a single comparison used to determine a transmitter yielding decision. In some other embodiments, e.g., an embodiment using a individual link based spillage determination approach, threshold comparison sub-module 542 makes one or more comparisons, one for each link of which the interference effect is to be considered, e.g., each of the higher priority links for which a request response above a predetermined level was detected. Comparison result 584 is an output of threshold comparison sub-module 542 and used by transmitter yielding module 532 in making its yielding decision.

Various approaches to thresholds are possible and different approaches are used in different alternative embodiments. In some embodiments, a fixed value is used for the threshold. In some embodiments, a threshold value is set based on historical data for an average experienced data rate. In various embodiments, a threshold value is set based on delay information, e.g., a threshold value is set based on an average scheduling delay. In some embodiments, the threshold is varied between a plurality of alternative fixed values, e.g., cyclically varied between two fixed values.

Priority module 546 determines the relative priorities associated with the different connections for the traffic transmission slot. In some embodiments, the priority associated with a particular connection identifier changes from one traffic transmission slot to another based on hopping information. In some embodiments, transmission request responses corresponding to higher priority links than that of wireless terminal 500 are used in performing a transmitter yielding decision, while lower priority links are not considered.

Traffic module 550 generates peer to peer traffic signal and controls the wireless transmitter module 504 to transmit the generated peer to peer traffic signals in a traffic segment of the traffic slot associated with the transmitted transmission request and received corresponding request response when the decision of the transmitter yielding module 532 is not to TX yield. Generated traffic signals 588, e.g., signals conveying user data such as image data, voice data, and/or file data, is an output of traffic module 550.

Channel measurement sub-module 536 measures channels between device 500 and other devices. Channel measurement sub-module 536 measures a channel gain between wireless terminal 500 and a second device with which wireless terminal has a current connection and to which wireless terminal 500 has transmitted a transmission request. Channel measurement sub-module 536 also measures a channel gain between wireless terminal 500 and a device which transmitted a request response signal which has been detected by wireless terminal 500, e.g., a request response signal directed to another wireless terminal. Channel measurement information 574 is an output of channel measurement sub-module 536 and is used as an input by aggregate based spillage determination sub-module 538 and individual link based spillage determination sub-module 540.

Aggregate based spillage determination sub-module 538 determines a spillage value based on the received link load weight value from a third device and a channel measurement value generated from a measurement of a channel between the third device and wireless terminal 500. In some embodiments, aggregate based spillage determination sub-module 538 generates a spillage aggregate value corresponding to a set of other links from which request responses were detected, e.g., each of the other links from which a request response was detected for the same traffic transmission slot, said set of other links including connections in which the first device does not participate. For example, the aggregate spillage value is based on multiple link load weight values and multiple channel measurements. In some embodiments, the aggregate based spillage determination sub-module 538 generates a spillage aggregate corresponding to higher priority links than the link between wireless terminal 500 and a second communications device, e.g., lower priority links are not considered in the spillage aggregate determination. In one embodiment, an interference cost estimate is a spillage aggregate value divided by a link load weight value corresponding to a link between wireless terminal 500 and the second communications device. Determined aggregate spillage value 576 is an output of aggregate based spillage determination sub-module 538 and an input to threshold comparison sub-module 542.

Individual link based spillage determination sub-module 540 determines individual spillage determination corresponding to each of one or more received request response signals corresponding to links of which wireless terminal 500 is not a member. For example, individual link based spillage determination sub-module 538 determines a first spillage value based on the received link load weight value from a third device and a channel measurement value generated from a measurement of a channel between the third device and wireless terminal 500, and individual link based spillage determination sub-module 538 determines a second spillage value based on the received link load weight value from a fourth device and a channel measurement value generated from a measurement of a channel between the fourth device and wireless terminal 500. In one embodiment, an interference cost estimate is an individual link based spillage value divided by a link load weight value corresponding to a link between wireless terminal 500 and the second communications device. Determined spillage value for first other link 578 is an output of individual link based spillage determination sub-module 540 and an input to threshold comparison sub-module 542. Similarly, determined spillage value for Nth other link 580 is an output of individual link based spillage determination sub-module 540 and an input to threshold comparison sub-module 542.

Figure 6:
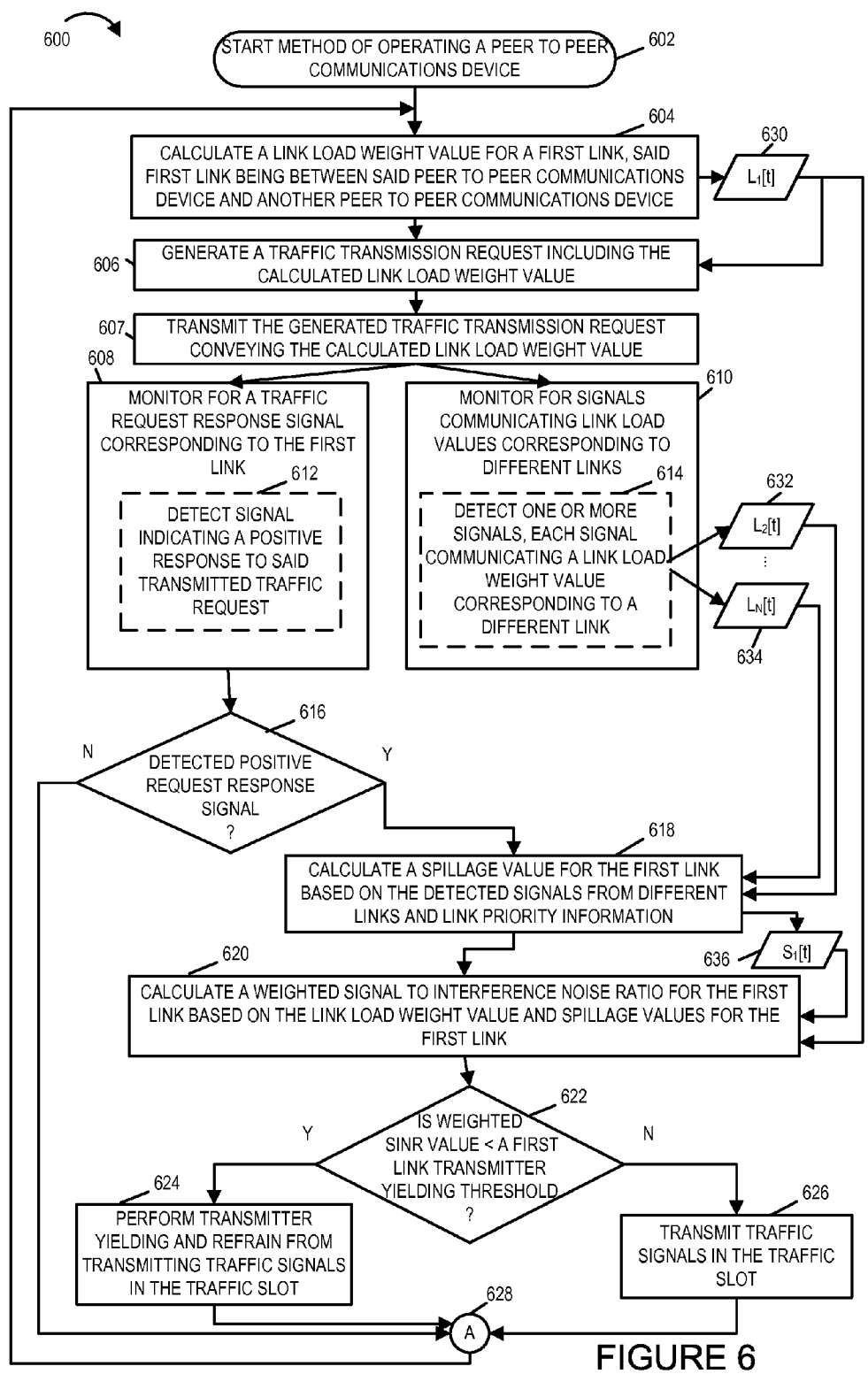
FIG. 6 is a flowchart of an exemplary method of operating of a peer to peer communications device in accordance with an exemplary embodiment.

FIG. 6 is a flowchart 600 of an exemplary method of operating of a peer to peer communications device in accordance with an exemplary embodiment. Operation starts in step 602, where the communications device is powered on an initialized. In step 602 the peer to peer communications device establishes a connection with another peer to peer communications device corresponding to a first link, said first link being between the peer to peer communications device implementing the method and said another peer to peer communications device.

Operation proceeds from step 602 to step 604. In step 604, the peer to peer communications device calculates a link load weight value for the first link, e.g., first link load value $L_1[t]$ 630. In various embodiments, the link load weight value is generated from at least one of: i) a transmit queue length, e.g., indicating the amount of data in a transmit queue corresponding to a transmission request; ii) a quality of service requirement corresponding to traffic data to be transmitted, e.g., data rate, latency, traffic, traffic type, etc.; and iii) a pre-calculated indication of the probability of successful communication over a communications link between the peer to peer communications device and the device to which the traffic transmission request is directed. Then in step 606 the peer to peer communications device generates a traffic transmission request including the calculated link load weight value. Operation proceeds from step 606 to step 607 in which the communications device transmits the generated traffic transmission request conveying the calculated link load weight value. In one embodiment, the calculated link load value is represented as bits and the bits are conveyed via phase information of a traffic transmission request signal.

In an alternative embodiment, different signals are generated to convey the calculated link load weight value and the traffic transmission request, and those generated signals are transmitted.

Operation proceeds from step 607 to step 608 and step 610. In step 608 the communications device monitors for a traffic transmission request response signal corresponding to its previously transmitted traffic transmission request requesting to transmit traffic signals in the current traffic slot corresponding to the first link. At times sub-step 612 is performed, in which the communications device detects a signal indicating a positive response to the transmitted traffic transmission request for the first link, e.g., the communications device detects and receives an RX echo signal from the device to which the request was sent, which indicates a positive response to the traffic transmission request.

In step 610 the communications device monitors for signals communicating link load values corresponding to different links. In some embodiments, the link load values are conveyed in traffic transmission request response signals. At times sub-step 614 is performed in which the communications device detects one or more signals, each detected signal communicating a link load weight value corresponding to a different link. Link load value $L_2[t]$ 632 and link load value $L_N[t]$ 634 are exemplary outputs from sub-step 614.

Operation proceeds from step 608 to step 616. In step 616 the communications device proceeds based on whether or not the communications device has detected a positive request response signal in response to its previously transmitted transmission request signal of step 607. If it has detected a positive response signal, then operation proceeds from step 616 to step 618; otherwise operation proceeds from step 616 to connecting node A 628.

In step 618 the communications device calculates a spillage value for the first link based on the detected signals from different links and link priority information. In some embodiment, the communications device selectively uses information corresponding to links of higher priority than the first link in calculating the spillage value for the first link. For example, channel gains between the communications device and those communications devices with higher priority links which transmitted request response signals are used in combination with link load weight values communicated corresponding to the higher priority links to calculate a spillage value for the first link. Spillage value $S_1[t]$ 636 is an output of step 618.

Operation proceeds from step 618 to step 620 in which the communications device calculates a weighted signal to interference ratio (SINR) for the first link based on the link load weight value for the first link and spillage value for the first link (630, 636). In one embodiment, $SINR_1 = L_1[t]/S_1[t]$. Operation proceeds from step 620 to step 622. In step 622 the communications device determines if the calculated weighted SINR value of step 620 is less than a first link transmitter yielding threshold. If the calculated weighted SINR is less than the yielding threshold ($\beta_1$), then operation proceeds from step 622 to step 624 in which the communications device performs transmitter yielding and refrains from transmitting traffic signals in the traffic slot. However, if the calculated SINR is greater than or equal to the first transmitter yielding threshold, then operation proceeds from step 622 to step 626 in which the communications device transmits traffic signals in the traffic slot. Operation proceeds from step 624 or step 626 to connecting node A 628, and from connecting node A 628 to the input of step 604, where the communications device calculates a link load value for the first link for another traffic slot.

In some alternative embodiments, individual spillage values are calculated corresponding to individual pairs of links with a pair including the first link and another link, e.g., (first link, second link), (first link, Nth link), where the second and Nth link correspond to links having higher priority than the first link. In one such embodiment, individual weighted signal to interference noise ratios are calculated for each pair and individually compared to a yielding threshold. In some such embodiments, if any one comparison tests indicates that TX yielding should occur, TX yielding is implemented.

In some embodiments, an interference cost estimate is determined based on the spillage value, e.g., the interference cost estimate is a reciprocal of the calculated weighted signal to interference noise ratio. In some such embodiments, the transmitter yielding decision is performed based on the comparison between the interference cost estimate and a threshold, e.g., with transmitter yielding being performed when the interference cost estimate exceeds a threshold.

Figure 7:
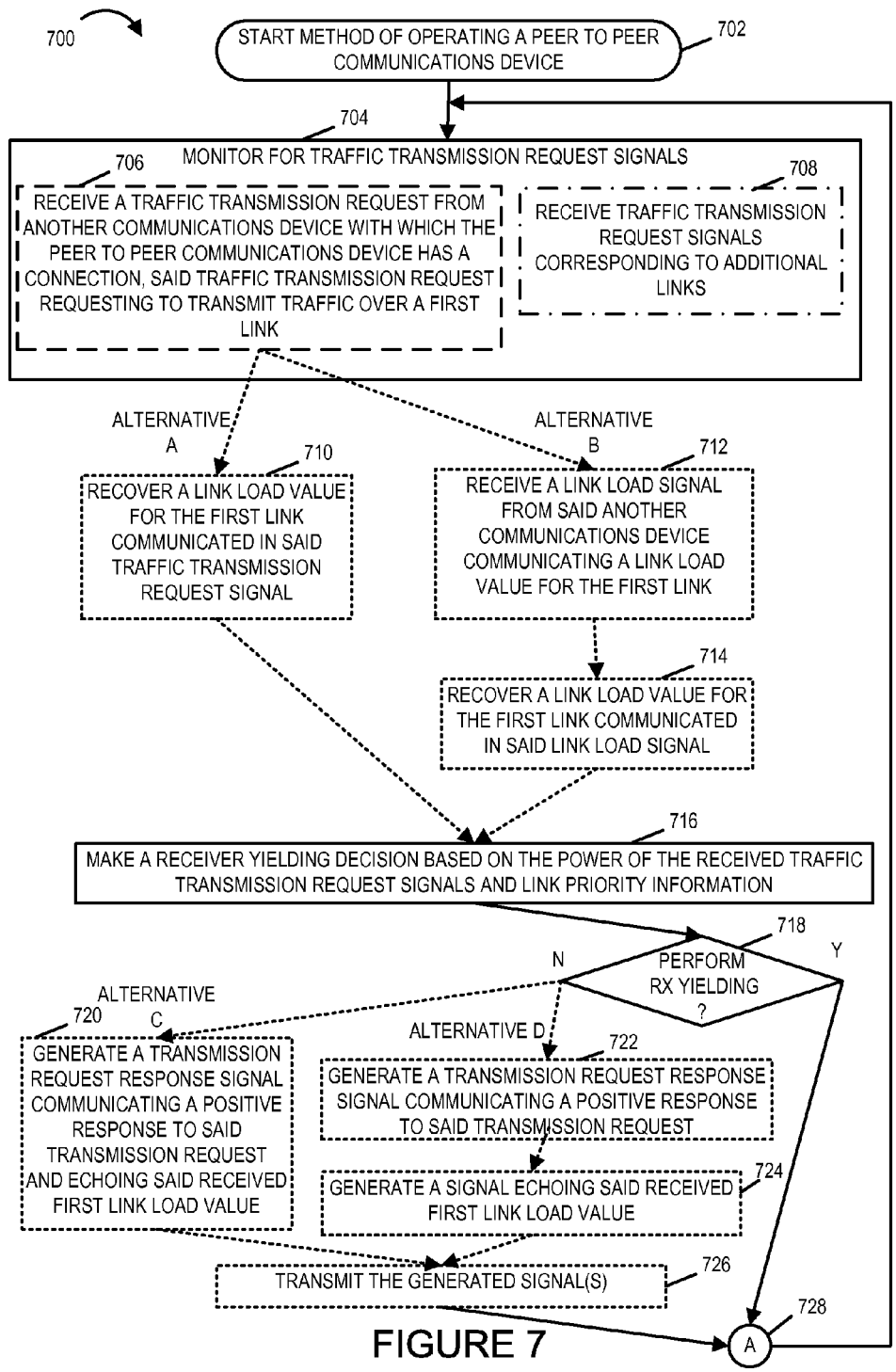
FIG. 7 is a flowchart of an exemplary method of operating a peer to peer communications device in accordance with an exemplary embodiment.

FIG. 7 is a flowchart 700 of an exemplary method of operating a peer to peer communications device in accordance with an exemplary embodiment. Operation of the exemplary method starts in step 702, where the communication device is powered on and initialized. In step 702, the communications device has established a peer to peer connection with another peer to peer communications device corresponding to a first link. Operation proceeds from step 702 to step 704.

In step 704 the communications device monitors for traffic transmission request signals. At times steps 706 and/or 708 are performed as part of step 704. In sub-step 706 the communications device receives a traffic transmission request from the another communications device with which the communications device has a connection, said traffic transmission request being a request to transmit traffic to the communications device over the first link. In sub-step 706, the communications device receives traffic transmission request signals corresponding to additional links.

Operation proceeds from sub-step 706 to sub-step 710 or sub-step 712 depending upon the implementation. If link load values are conveyed in traffic transmission request signals, then alternative A is used and operation proceeds from sub-step 706 to step 710. However, if link load values are communicated in signals independently from traffic transmission request signals, then alternative B is used and operation proceeds from sub-step 706 to step 712.

In step 710 the communications device recovers a link load value for the first link communicated in the traffic transmission request signal received in sub-step 706. Operation proceeds from step 710 to step 716.

In step 712 the communications device receives a link load signal from said another communications device communicating a link load value for the first link. Then, in step 714 the communications device recovers a link load value for the first link communicated in the received link load signal. Operation proceeds from step 714 to step 716.

In step 716 the communications device makes a receiver yielding decision based on the power of the received traffic transmission request signals and link priority information. For example, the communications device considers whether or not to yield to higher priority links based on the received power of traffic transmission request signals corresponding to those higher priority links and the received power of the traffic transmission request signal corresponding to the first link. Note that in this embodiment, the receiver yielding does not use link load value information in making a receiver yielding decision.

Operation proceeds from step 716 to step 718. In step 718, the communications device proceeds based on the receiver yielding decision of step 716. If the decision of the step 716 is to perform receiver yielding, then operation proceeds from step 718 to connecting node A 728. However, if the decision of step 718 is not to perform receiver yielding, then operation proceeds from step 718 to step 720 or step 722, depending upon the implementation. If the implementation is such that a transmission request response signal carries a link load value, then alternative C is used, and operation proceeds from step 718 to step 720. If the implementation is such that a link load value is communicated independently from a transmission request response signal, then operation proceeds from step 718 to step 722.

Returning to step 720, in step 720 the communications device generates a transmission request response signal communicating a positive response to the transmission request of sub-step 706 and echoing the received first link load value. Operation proceeds from step 720 to step 726.

Returning to step 722, in step 722 the communications device generates a transmission request response signal communicating a positive response to the transmission request. Operation proceeds from step 722 to step 724. In step 724 the communications device generates a signal echoing the received first link load signal. Operation proceeds from step 724 to step 726.

In step 726 the communications device transmits the generated signals or signals of steps 720 or of steps 722 and 724. Operation proceeds from step 726 to connecting node A 728. Operation proceeds from connecting node A 728 to the input of step 704, where the communications device monitors for traffic transmission request signals corresponding to another traffic slot.

In an alternative embodiment, the communications device optionally modifies a received link load weight value corresponding to the first link based on local information, instead of simply echoing a received link load weight value. Local information includes, e.g., receiver information such as the receiver buffer capacity, current receiver buffer condition such as amount of used and/or unused buffer capacity, device display capability, determined priority of other links requesting to communicate with the communications device, and number of other links via which requests to communicate with the communications device were detected. Thus in some embodiments, the received link load weight value for the first link, may be, and sometimes is, is different from the transmitted link load weight value.

Figure 8:
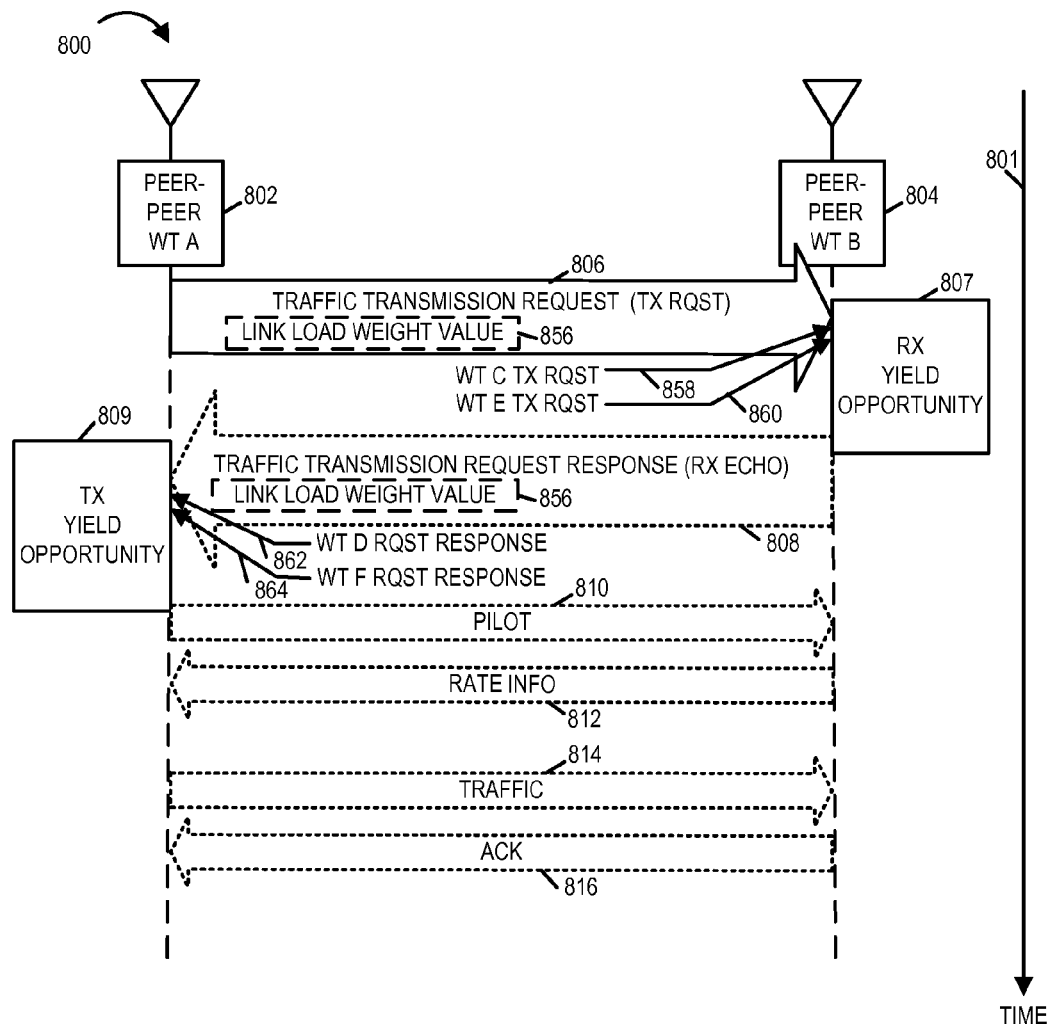
FIG. 8 is a drawing illustrating two exemplary peer to peer wireless terminals which have a peer to peer connection and exemplary signaling exchanged in a traffic data slot of an exemplary recurring timing and frequency structure used in a peer to peer network.

FIG. 8 is a drawing 800 illustrating two exemplary peer to peer wireless terminals (WT A 802, WT B 804), which have a peer to peer connection and exemplary signaling exchanged in a traffic data slot of an exemplary recurring timing and frequency structure used in a peer to peer network. WTs (802, 804) are, e.g., wireless terminals implementing a method in accordance with one or more of FIG. 6 and FIG. 7. Drawing 800 also include time axis 801. WT A 802 generates and transmits a traffic transmission request signal (TX RQST) 806 to WT B 804 requesting to transmit traffic signals to WT B 804 in the traffic slot. In some embodiments, the traffic transmission request signal 806 also conveys a link load weight value 856 corresponding to the link between WT A 802 and WT B 804. In some embodiments, the link load weight value 856 is communicated via phase information of the traffic transmission request signal 806.

Wireless terminal B 804 receives traffic transmission request signal 806. Wireless terminal B 804 may also receive traffic transmission request signals corresponding to other connections, e.g., between different pairs of wireless terminals which may want to communicate traffic signals concurrently with the intended WT A traffic signaling and/or corresponding to other connections with WT B 804. WT C sourced traffic transmission request signal 858 and WT E sourced traffic transmission request signal 860 represent such signals. WT B 804 monitors for and detects traffic transmission request signals corresponding to other links. WT B 804 has a receiver yielding opportunity, as indicated by block 807. WT B 804 makes a receiver yielding decision based on the power of the received traffic transmission signal 806 and received traffic transmission signals corresponding to higher priority connections than its own connection under consideration. If WT B 804 decides that interference from higher priority connections is expected to unacceptably impact its recovery of traffic signals from WT A 802, WT B decides to yield and does not transmit a request response signal. However, if WT B decides not to yield, then WT B 804 generates and transmits traffic transmission request response signal (RX echo) 808 to WT A 804. In some embodiments, WT B 804 includes the received link load weight value 856 from WT A 804 in the received traffic transmission request response signal 808, e.g., using phase information. In some other embodiments, WT B 804 may, and sometimes does modify the link load weight value in the received traffic transmission request 806 based on local information, e.g., receiver unused and/or used buffer capacity, device display capability, number of additional received requests corresponding to other links with WT B, etc., and the modified link load weight value is conveyed in the traffic transmission request response signal 808, if transmitted.

WT A 802 receives traffic transmission request response signal 808 from WT B 804, and possibly traffic transmission request response signals from other connections. Request response signal 862 sourced from WT D and request response signal 864 sourced from WT F are examples request response signals corresponding to other connections. In this embodiment, each traffic transmission request response signal conveys a link load weight value corresponding to its link. WT A 802 measures the power of the received signals and recovers link load weight values corresponding to other links. WT A 802 also recovers the link load value corresponding to its link with WT B if WT B can modify the transmitted link load value. WT A 802 measures the channel between itself and each of the sources of the detected traffic transmission request response signals. WT A 802 has a transmitter yielding opportunity, as indicated by block 809 and makes a transmitter yielding decision based on the received power of transmission request response signals corresponding to its own link, the received power of transmission request response signals corresponding to higher priority links, the link load value corresponding to its own link, and the link load values corresponding to higher priority links, the channel between itself and WT B, and the channel between itself and each of the other sources of the detected request response signals corresponding to higher priority links. The transmitter yielding decision is made based on the amount of interference that WT A 802 is expected to cause to other higher priority connections.

If WT A 802 decides to yield, it refrains from transmitting a pilot signal in this traffic slot and does not transmit traffic signals in this traffic slot. If WT A 802 decides not to yield, WT A transmits pilot signal 810 to WT B 804. Then WT B 804 receives the pilot signal, estimates channel conditions, generates and transmits rate information signals 812, e.g., indicating a maximum supported data rate or a commanded data rate or a requested data rate to be used for traffic signals in this traffic slot.

WT A 802 receives rate information signal 812 determines a data rate to be used for traffic signals, generates and transmits peer to peer traffic signals 814 to WT B 804. WT B 804 receives the traffic signals 814 and if the traffic information recovery is successful, generates and transmits traffic acknowledgment signal 816 to WT A 802.

Note that traffic scheduling, in this embodiment, is performed in a decentralized manner, on a traffic slot by traffic slot basis. Link load weight values, in this embodiment, are also determined and communicated on a slot by slot basis. In some embodiments, criteria used for transmitter yielding, e.g., an SINR comparison limit value, can be, and sometimes is varied over time.

Figure 9:
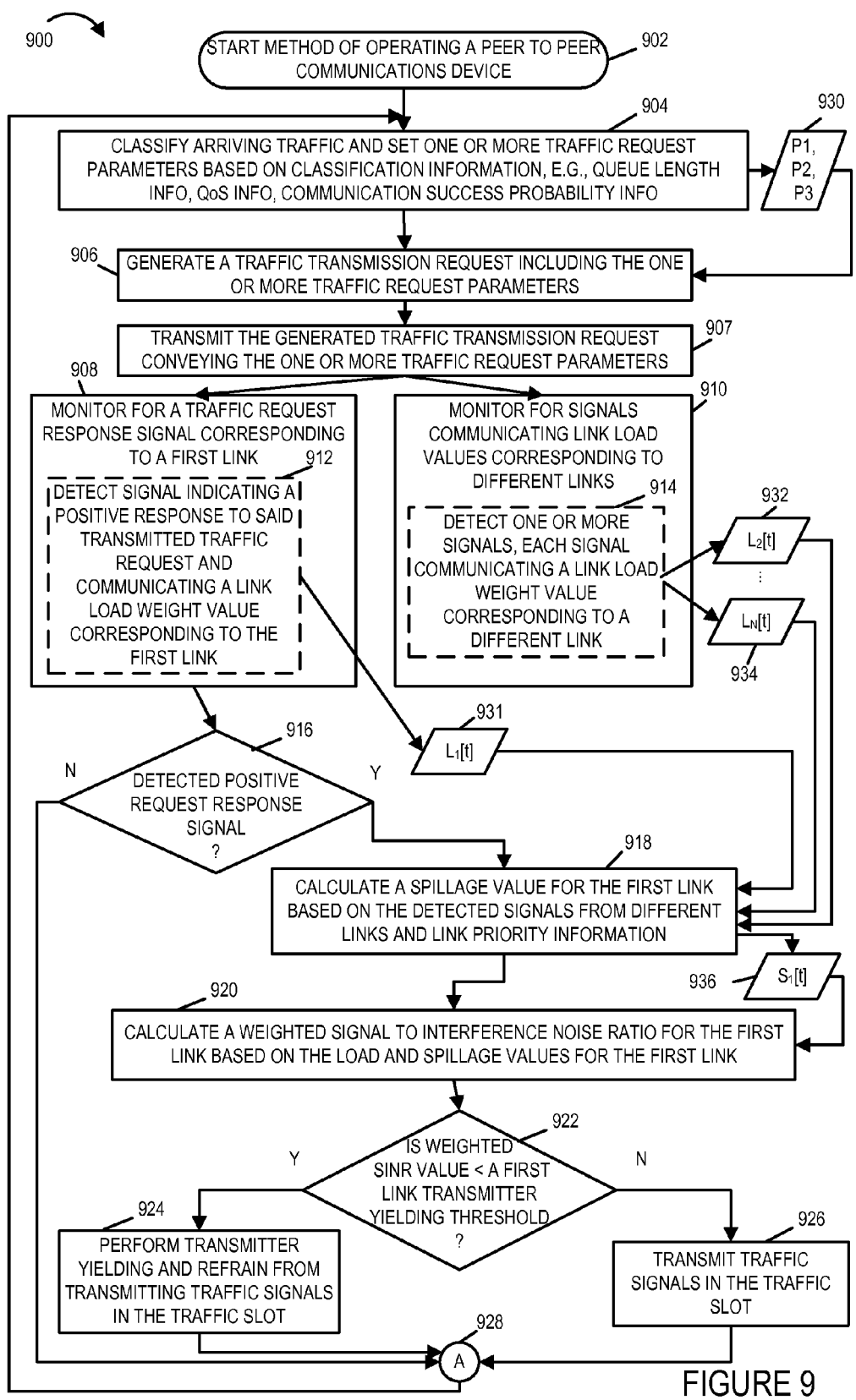
FIG. 9 is a flowchart of an exemplary method of operating of a peer to peer communications device in accordance with an exemplary embodiment.

FIG. 9 is a flowchart 900 of an exemplary method of operating of a peer to peer communications device in accordance with an exemplary embodiment. Operation starts in step 902, where the communications device is powered on an initialized. In step 902 the peer to peer communications device establishes a connection with another peer to peer communications device corresponding to a first link, said first link being between the peer to peer communications device implementing the method and said another peer to peer communications device.

Operation proceeds from step 902 to step 904. In step 904, the peer to peer communications device classifies arriving traffic and sets one or more traffic request parameters based on the classification information, e.g., transmit queue length information, quality of service information, communications success probability information. Transmit queue length is, e.g., information indicating the amount of data in one or more transmit queues corresponding to the transmit request. Quality of service requirement information corresponding to traffic data to be transmitted is, e.g., information indicating data rate, latency, and/or traffic type information. Communication success probability information is, e.g., a pre-calculated indication of the probability of successful communication over a communications link between the communications device and the communication device to which a traffic transmission request is to be direct. In one embodiment a traffic request parameter or information indicating a plurality of traffic request parameters in combination is represented as bits and the bits are conveyed via phase information of a traffic transmission request signal. Parameter set information 930 including parameters P1, P2, P3 is an exemplary output of step 904.

Operation proceeds from step 904 to step 906 in which the communications device generates a traffic transmission request including the one or more traffic request parameters. Then, in step 907 the communications device transmits the generated traffic transmission request conveying the one or more traffic request parameters.

Operation proceeds from step 907 to step 908 and step 910. In step 908 the communications device monitors for a traffic transmission request response signal corresponding to a previously transmitted traffic transmission request requesting to transmit traffic signals in the current traffic slot. At times sub-step 912 is performed, in which the communications device detects a signal indicating a positive response to the transmitted traffic transmission request for the first link, e.g., the communications device detects and receives an RX echo signal from the device to which the request was sent, which indicates a positive response to the traffic transmission request, and the received signal also communicates a link load weight value corresponding to the first link. Thus link load weight value $L_1[t]$ 931 is recovered.

In step 910 the communications device monitors for signals communicating link load weight values corresponding to different links. In some embodiments, the link load values are conveyed in traffic transmission request response signals. At times sub-step 914 is performed in which the communications device detects one or more signals, each detected signal communicating a link load weight value corresponding to a different link. Link load value $L_2[t]$ 932 and link load value $L_N[t]$ 934 are exemplary outputs from sub-step 914.

Operation proceeds from step 908 to step 916. In step 916 the communications device proceeds based on whether or not the communications device has detected a positive request response signal in response to its previously transmitted transmission request signal of step 907. If it has detected a positive response signal, then operation proceeds from step 916 to step 918; otherwise, operation proceeds from step 916 to connecting node A 928.

In step 918 the communications device calculates a spillage value for the first link based on the detected signals from different links and link priority information. In some embodiment, the communications device selectively uses information corresponding to links of higher priority than the first link in calculating the spillage value for the first link. For example, channel gains between the communications device and those communications devices with higher priority links which transmitted request response signals are used in combination with link load weight values communicated corresponding to the higher priority links to calculate a spillage value for the first link. Spillage value $S_1[t]$ 936 is an output of step 918.

Operation proceeds from step 918 to step 920 in which the communications device calculates a weighted signal to interference ratio (SINR) for the first link based on the link load weight value for the first link and the spillage value for the first link (931, 936). In one embodiment, $SINR_1 = L_1[t]/S_1[t]$. Operation proceeds from step 920 to step 922. In step 922 the communications device determines if the calculated weighted SINR value of step 920 is less than a first link transmitter yielding threshold. If the calculated weighted SINR is less than the yielding threshold ($\beta_1$), then operation proceeds from step 922 to step 924 in which the communications device performs transmitter yielding and refrains from transmitting traffic signals in the traffic slot. However, if the calculated weighted SINR is greater than or equal to the first transmitter yielding threshold, then operation proceeds from step 922 to step 926 in which the communications device transmits traffic signals in the traffic slot. Operation proceeds from step 924 or step 926 to connecting node A 928, and from connecting node A 928 to the input of step 904, where the communications device calculates a link load value for the first link for another traffic slot.

In some alternative embodiments, individual spillage values are calculated corresponding to individual pairs of links with a pair including the first link and another link, e.g., (first link, second link), (first link Nth link), where the second and Nth link correspond to links having higher priority than the first link. In one such embodiment, individual weighted signal to interference noise ratios are calculated for each pair and individually compared to a yielding threshold. In some such embodiments, if any one comparison test indicates that TX yielding should occur, TX yielding is implemented.

In some embodiments, an interference cost estimate is determined based on the spillage value, e.g., the interference cost estimate is a reciprocal of the calculated weighted signal to interference noise ratio. In some such embodiments, the transmitter yielding decision is performed based on the comparison between the interference cost estimate and a threshold, e.g., with transmitter yielding being performed when the interference cost estimate exceeds a threshold.

Figure 10:
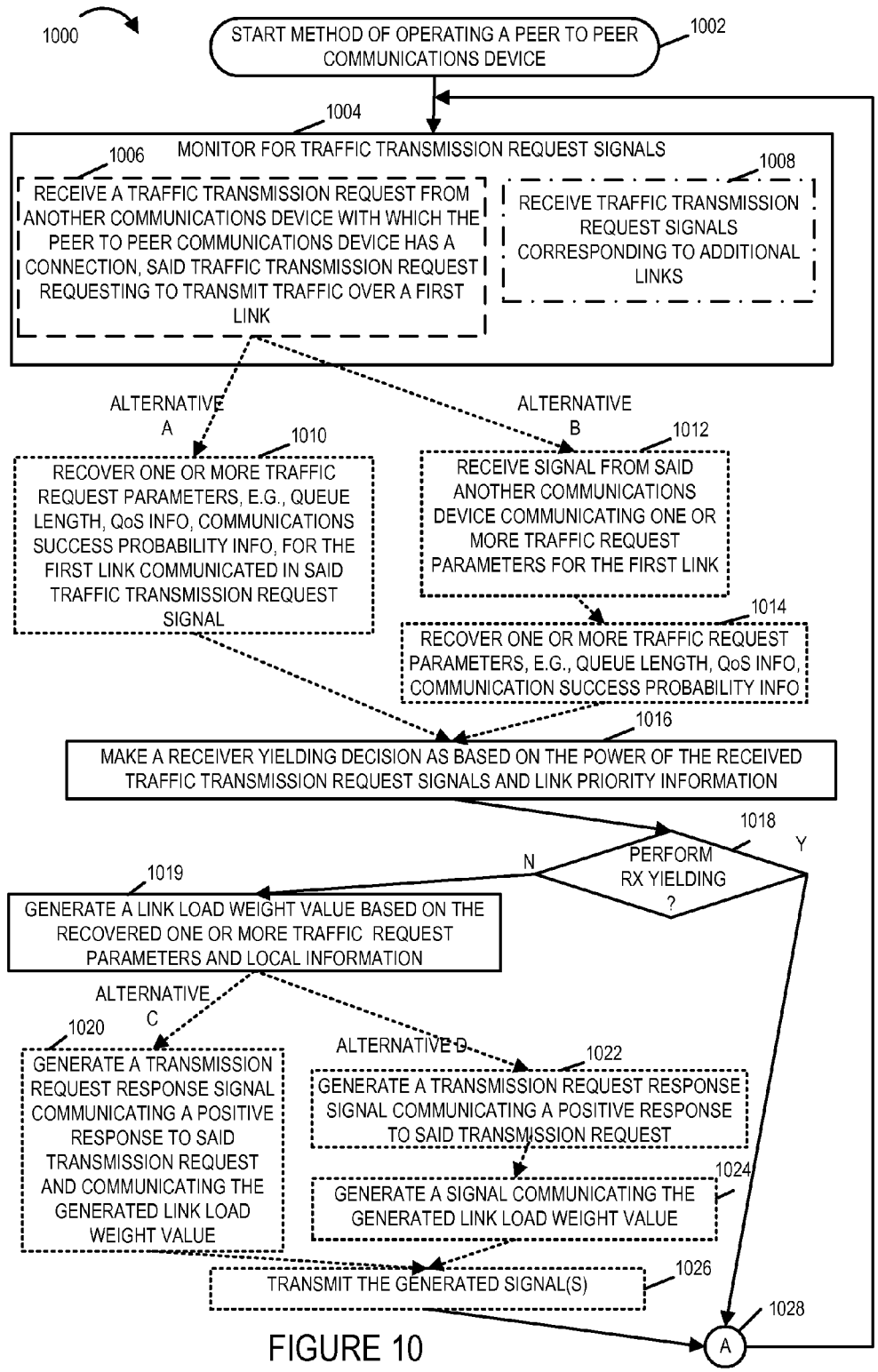
FIG. 10 is a flowchart of an exemplary method of operating a peer to peer communications device in accordance with an exemplary embodiment.

FIG. 10 is a flowchart 1000 of an exemplary method of operating a peer to peer communications device in accordance with an exemplary embodiment. Operation of the exemplary method starts in step 1002, where the communication device is powered on and initialized. In step 1002, the communications device has established a peer to peer connection with another peer to peer communications device corresponding to a first link. Operation proceeds from step 1002 to step 1004.

In step 1004 the communications device monitors for traffic transmission request signals. At times steps 1006 and/or 1008 are performed as part of step 1004. In sub-step 1006 the communications device receives a traffic transmission request from the another communications device with which the communications device has a connection, said traffic transmission request being a request to transmit traffic to the communications device over the first link. In sub-step 1006, the communications device receives traffic transmission request signals corresponding to additional links.

Operation proceeds from sub-step 1006 to sub-step 1010 or sub-step 1012 depending upon the implementation. If traffic request parameters are conveyed in traffic transmission request signals, then alternative A is used and operation proceeds from sub-step 1006 to step 1010. However, if traffic request parameters are communicated in signals independently from traffic transmission request signals, then alternative B is used and operation proceeds from sub-step 1006 to step 1012.

In step 1010 the communications device recovers one or more traffic request parameters for the first link communicated in the traffic transmission request signal received in sub-step 1006. Exemplary traffic request parameters include: a transmit queue length parameter indicating the amount of data in a transmit queue corresponding to the transmission request; a quality of service requirement parameter indicating, e.g., one of more of data rate, latency, and traffic type; and a communications success probability information parameter indicating a pre-calculated indication of the probability of successful communication of the link. Operation proceeds from step 1010 to step 1016.

In step 1012 the communications device receives a signal from said another communications device communicating one or more traffic request parameters, e.g., queue length parameter, QoS information parameter, communications success parameter, etc. for the first link. Then, in step 1014 the communications device recovers the one or more traffic request parameters being communicated in the received link load signal of step 1012. Operation proceeds from step 1014 to step 1016.

In step 1016 the communications device makes a receiver yielding decision based on the power of the received traffic transmission request signals and link priority information. For example, the communications device considers whether or not to yield to higher priority links based on the received power of traffic transmission request signals corresponding to those higher priority links and the received power of the traffic transmission request signal corresponding to the first link. Note that in this embodiment, the receiver yielding does not use link load weight values in making a receiver yielding decision. In some other embodiments, link load weight values and/or recovered traffic request parameters are used in the receiver yielding decision.

Operation proceeds from step 1016 to step 1018. In step 1018, the communications device proceeds based on the receiver yielding decision of step 1016. If the decision of the step 1016 is to perform receiver yielding, then operation proceeds from step 1018 to connecting node A 1028. However, if the decision of step 1018 is not to perform receiver yielding, then operation proceeds from step 1018 to step 1019.

In step 1019 the communications device generates a link load weight value based on the recovered one or more traffic request parameters and local information. Local information includes, e.g., receiver information such as the receiver buffer capacity, current receiver buffer condition such as amount of used and/or unused buffer capacity, device display capability, determined priority of other links requesting to communicate with the communications device, and number of other links via which requests to communicate with the communications device were detected.

Operation proceeds from step 1019 to step 1020 or step 1022, depending upon the implementation. If the implementation is such that a transmission request response signal carries a link load value, then alternative C is used, and operation proceeds from step 1018 to step 1020. If the implementation is such that a link load value is communicated independently from a transmission request response signal, then operation proceeds from step 1018 to step 1022.

Returning to step 1020, in step 1020 the communications device generates a transmission request response signal communicating a positive response to the transmission request of sub-step 1006 and communicating the generated link load weight value. Operation proceeds from step 1020 to step 1026.

Returning to step 1022, in step 1022 the communications device generates a transmission request response signal communicating a positive response to the transmission request. Operation proceeds from step 1022 to step 1024. In step 1024 the communications device generates a signal communicating the generated link load weight value. Operation proceeds from step 1024 to step 1026.

In step 1026 the communications device transmits the generated signal of step 1020 or signals of steps 1022 and 1024. Operation proceeds from step 1026 to connecting node A 1028. Operation proceeds from connecting node A 1028 to the input of step 1004, where the communications device monitors for traffic transmission request signals corresponding to another traffic slot.

Figure 11:
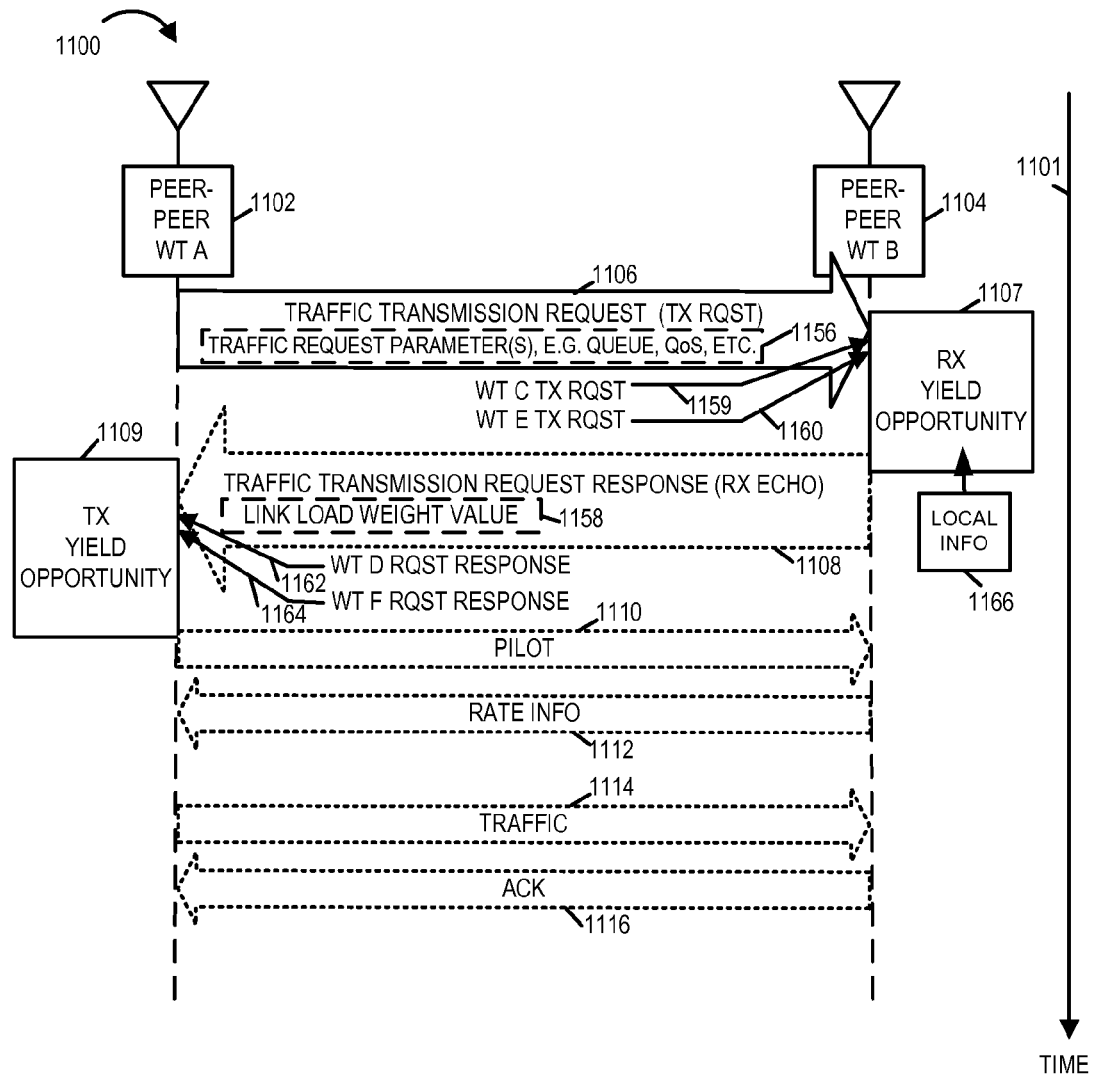
FIG. 11 is a drawing illustrating two exemplary peer to peer wireless terminals which have a peer to peer connection and exemplary signaling exchanged in a traffic data slot of an exemplary recurring timing and frequency structure used in a peer to peer network.

FIG. 11 is a drawing 1100 illustrating two exemplary peer to peer wireless terminals (WT A 1102, WT B 1104), which have a peer to peer connection and exemplary signaling exchanged in a traffic data slot of an exemplary recurring timing and frequency structure used in a peer to peer network. WT 1102 and WT 1104 are, e.g, exemplary WTs implementing a method or methods in accordance with one of more of FIG. 9 and FIG. 10. Drawing 1100 also include time axis 1101. WT A 1102 generates and transmits a traffic transmission request signal (TX RQST) 1106 to WT B 1104 requesting to transmit traffic signals to WT B 1104 in the traffic slot. In some embodiments, the traffic transmission request signal 1106 also conveys traffic request parameters, e.g., a transmit queue length parameter indicating the amount of data in one or more transmit queues corresponding to the transmission request, a QoS requirement parameter corresponding to traffic data to be transmitted indicating, e.g., at least one of data rate, latency, and traffic type, and/or a traffic communication success probability parameter indicating a pre-calculated indication of the probability of successful communication over the communications link between WT A 1102 and WT B 1104, corresponding to the link between WT A 1102 and WT B 1104. In some embodiments, the traffic request parameter(s) 1156 is communicated via phase information of the traffic transmission request signal 1106.

Wireless terminal B 1104 receives traffic transmission request signal 1106. Wireless terminal B 1104 may also receive traffic transmission request signals corresponding to other connections, e.g., between different pairs of wireless terminals which may want to communicate traffic signals concurrently with the intended WT A traffic signaling and/or corresponding to other connections with WT B 1104. WT C sourced traffic transmission request signal 1159 and WT E sourced traffic transmission request signal 1160 represent such signals. WT B 1104 monitors for and detects traffic transmission request signals corresponding to other links. WT B 1104 has a receiver yielding opportunity, as indicated by block 1107. WT B 1104 makes a receiver yielding decision based on the power of the received traffic transmission signal 1106 and received traffic transmission signals corresponding to higher priority connections than its own connection under consideration. If WT B 1104 decides that interference from higher priority connections is expected to unacceptably impact its recovery of traffic signals from WT A 1102, WT B 1104 decides to yield and does not transmit a request response signal. However, if WT B 1104 decides not to yield, then WT B 1104 generates and transmits traffic transmission request response signal (RX echo) 1108 to WT A 1102. WT B 1104 generates link load weight value 1158 based on of the received traffic request parameter(s) 1156 and local information, e.g., receiver unused and/or used buffer capacity, device display capability, number of additional received requests corresponding to other links with WT B, etc. The generated link load weight value 1158 is conveyed in the traffic transmission request response signal 1108.

WT A 1102 receives traffic transmission request response signal 1108 from WT B 1104, and possibly traffic transmission request response signals from other connections. Request response signal 1162 sourced from WT D and request response signal 1164 sourced from WT F are examples request response signals corresponding to other connections. In this embodiment, each traffic transmission request response signal conveys a link load weight value corresponding to its link. WT A 1102 measures the power of the received signals and recovers link load weight values corresponding to each of the links. WT A 1102 measures the channel between itself and each of the sources of the detected traffic transmission request response signals. WT A 1102 has a transmitter yielding opportunity, as indicated by block 1109 and makes a transmitter yielding decision based on the received power of transmission request response signals corresponding to its own link, the received power of transmission request response signals corresponding to higher priority links, the link load value corresponding to its own link, and the link load values corresponding to higher priority links, the channel between itself and WT B, and the channel between itself and each of the other sources of the detected request response signals corresponding to higher priority links. The transmitter yielding decision is made based on the amount of interference that WT A 1102 is expected to cause to other higher priority connections.

If WT A 1102 decides to yield, it refrains from transmitting a pilot signal in this traffic slot and does not transmit traffic signals in this traffic slot. If WT A 1102 decides not to yield, WT A transmits pilot signal 1110 to WT B 1104. Then WT B 1104 receives the pilot signal, estimates channel conditions, generates and transmits rate information signals 1112, e.g., indicating a maximum supported data rate or a commanded data rate or a requested data rate to be used for traffic signals in this traffic slot.

WT A 1102 receives rate information signal 1112 determines a data rate to be used for traffic signals, generates and transmits peer to peer traffic signals 1114 to WT B 1104. WT B 1104 receives the traffic signals 1114 and if the traffic information recovery is successful, generates and transmits traffic acknowledgment signal 1116 to WT A 1102.

Note that traffic scheduling, in this embodiment, is performed in a decentralized manner, on a traffic slot by traffic slot basis. Link load weight values, in this embodiment, are also determined and communicated on a slot by slot basis. In some embodiments, criteria used for transmitter yielding, e.g., an SINR comparison limit value, can be, and sometimes is varied over time.

Figure 12:
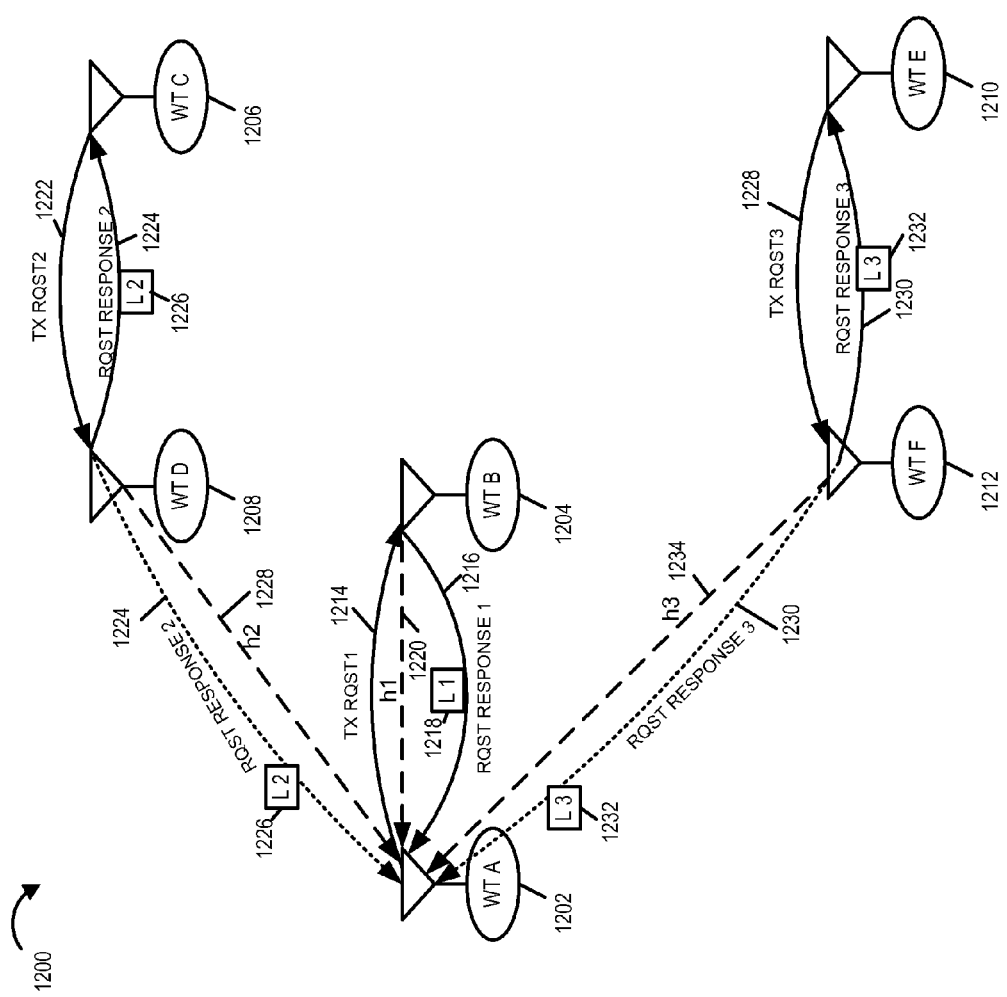
FIG. 12 is a drawing used to illustrate aspects of various embodiments including exemplary spillage calculations used in transmitter yielding determinations based on link load weight values.

FIG. 12 is a drawing 1200 used to illustrate aspects of various embodiments including exemplary spillage calculations used in transmitter yielding determinations based on link load weight values. In FIG. 12 wireless terminal A (WT A 1202) and WT B 1204 have a first connection referred to as peer to peer connection 1; WT C 1206 and WT D 1208 have a second connection referred to as peer to peer connection 2; WT E 1210 and WT F 1212 have a third connection referred to as connection 3. WTs (1202, 1204, 1206, 1208, 1210, 1212) are, e.g., any of the WTs shown, described and/or implementing one or more of the methods of one or more of FIGS. 1-11.

Assume that connection 1 is lower priority than both connection 2 and connection 3 for this particular traffic transmission slot. Further assume that (WT A 1202, WT C 1206, WT E 1210) each desire to transmit traffic signals to (WT B 1204, WT D 1208, WT F 1212), respectively, in the traffic slot using the same air link traffic resource, e.g. traffic segment.

In the transmission request block (WT A 1202, WT C 1206, WT E 1210) transmit traffic transmission request signals (TX request 1 1214, TX request 2 1222, TX request 3 1228), respectively to (WT B 1204, WT D 1208, WT F 1212), respectively. Assume that the wireless terminals (WT B 1204, WT D 1208, WT F 1212) decide not to RX yield. Therefore the wireless terminals (WT B 1204, WT D 1208, WT F 1212) generate and transmit traffic transmission request response signals including link load weight values (request response 1 1216 including link load weight value L1 1218, request response 2 1224 including link load weight value L2 1226, request response 3 1230 including link load weight value L3 1232) to the wireless terminals (WT A 1202, WT C 1206, WT E 1210), respectively.

In this example we are considering the TX yielding determination of WT A 1202. WT A 1202 monitors for and detects request response 1 1216 including link load weight value L1 1218. WT A determines, e.g., via measurement, an estimate of the channel between WT B and WT A 1202 which is designated h1 1220. It is assumed the channel is substantially the same from WT B to WT A as from WT A to WT B. WT A 1202 also monitors for and detects request response signals corresponding to other higher priority connections (request response 2 1224 conveying link load weight value L2 1226, request response 3 1230 conveying link load weight value L3 1232. WT A determines, e.g., via measurement, an estimate of the channel between WT D 1208 and WT A 1202 which is designated h2 1228. It is assumed the channel is substantially the same from WT D to WT A as from WT A to WT D. WT A determines, e.g., via measurement, an estimate of the channel between WT F 1212 and WT A 1202 which is designated h3 1234. It is assumed the channel is substantially the same from WT F to WT A as from WT A to WT F.

WT A 1202 calculates a spillage value to be used in its TX yielding determination. In some embodiments, WT A 1202 calculates an aggregate spillage value, e.g., Aggregate Spillage=(h2)(L2)/h1+(h3)(L3)/h1. Then WT A 1202 calculates a weighted SINR=L1/Aggregate Spillage. In some embodiments, WT A 1202 compares the weighted SINR to a threshold, and if it is lower than the threshold WT A decides to TX yield; otherwise it does not TX yield. In some embodiments, WT A 1202 determines an interference cost estimate from the weighted SINR, e.g., interference cost estimate=1/weighted SINR. Then WT A compares the interference cost estimate to a threshold and if the interference cost estimate is above the threshold WT performs TX yielding; otherwise, WT A does not TX yield.

The exemplary aggregate spillage calculation can be extended for N links of higher priority than the first link as:

Aggregate Spillage=$(h2)(L2)/h1+(h3)(L3)/h1+\ldots+(hN)(LN)/h1$.

In some embodiments WT A 1202 calculates individual spillage values corresponding to each higher priority link, e.g., Individual Spillage$_{12}$=$(h2)(L2)/h1$ Individual Spillage$_{13}$=$(h3)(L3)/h1$.

Then WT A 1202 calculates: a weighted SINR$_{12}$=L1/Individual Spillage$_{12}$ and a weighted SINR$_{13}$=L1/Individual Spillage$_{13}$. In some embodiments, WT A 1202 compares each weighted SINR to a threshold, and if any one is lower than the threshold WT A decides to TX yield; otherwise it does not TX yield. In some embodiments, WT A 1202 determines an individual interference cost estimates from the individual weighted SINRs, e.g., an individual interference cost estimate=1/an individual weighted SINR. Then WT A compares each interference cost estimate to a threshold and if any one of the individual cost estimates is above the threshold WT A 1202 decides to TX yield; otherwise, WT A 1202 does not TX yield.

Figure 13:
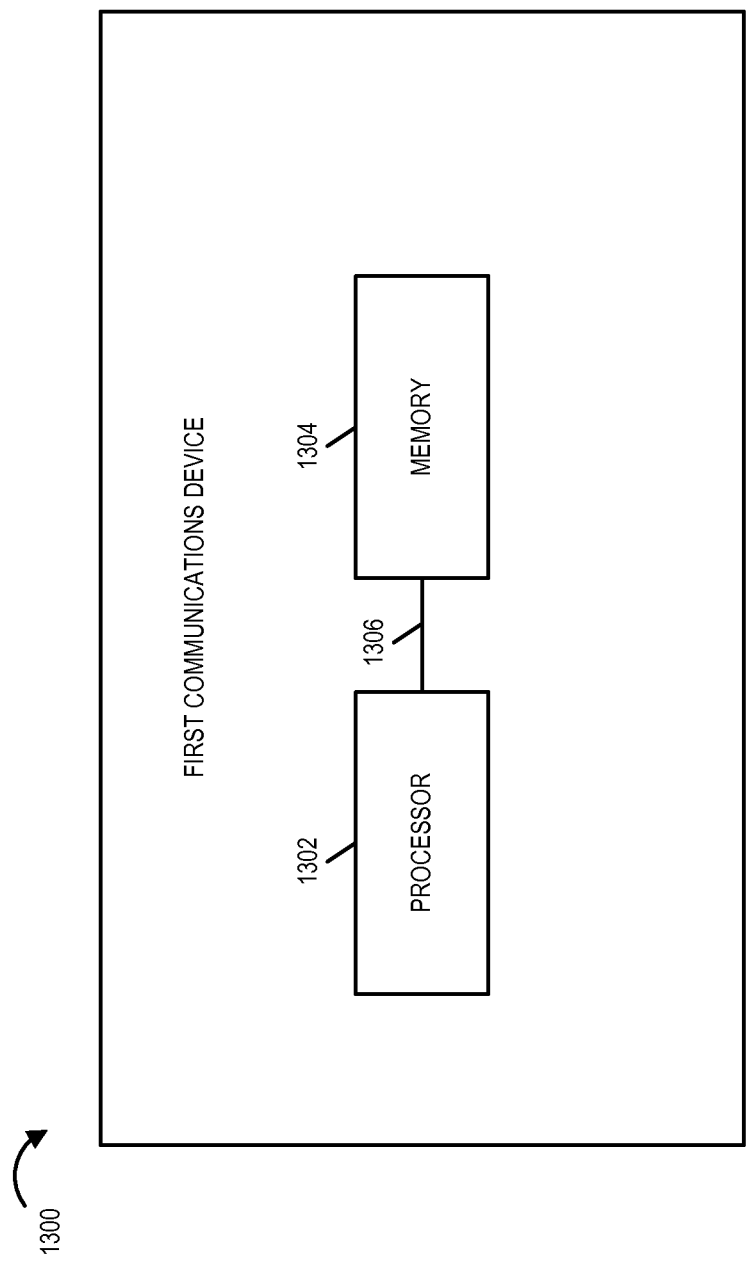
FIG. 13 is a drawing of an exemplary first communications device in accordance with an exemplary embodiment.

FIG. 13 is a drawing of an exemplary first communications device 1300 in accordance with an exemplary embodiment. First communications device 1300 is, e.g., a mobile wireless terminal supporting peer to peer communications and implementing a method in accordance with flowchart 200 of FIG. 2.

First communications device 1300 includes a processor 1302 and memory 1304 coupled together via a bus 1306 over which the various elements (1302, 1304) may interchange data and information. Processor 1302 is configured to: receive a transmission request from a second communications device, generate a link load weight value, and transmit, in response to the transmission request from the second communications device, a transmission request response including the link load weight value. The link load weight value, in some embodiments, is a weight to be used in making a transmitter yielding decision.

In some embodiments, the processor 1302 is configured to recover from the transmission request at least one parameter, said at least one parameter including at least one of: i) a transmit queue length; ii) a quality of service requirement corresponding to traffic data to be transmitted; or iii) a pre-calculated indication of a probability of successful communication over a communication link between the second communications device and the first communications device. In some such embodiments, the processor 1302 is further configured to generate a link load weight value using said at least one parameter in combination with at least some local information.

In some embodiments, the processor 1302 is further configured to: receive one or more additional transmission request during a request interval during which the transmission request from the second communications device is received; determine a number of additional transmission requests received during the request interval; and generate the link load weight value based on the determined number of additional transmission requests. In some such embodiments, the processor is further configured to generate said link load weight value based on: indicated transmission queue lengths and quality of service requirements indicated in the received additional transmission requests.

Figure 14:
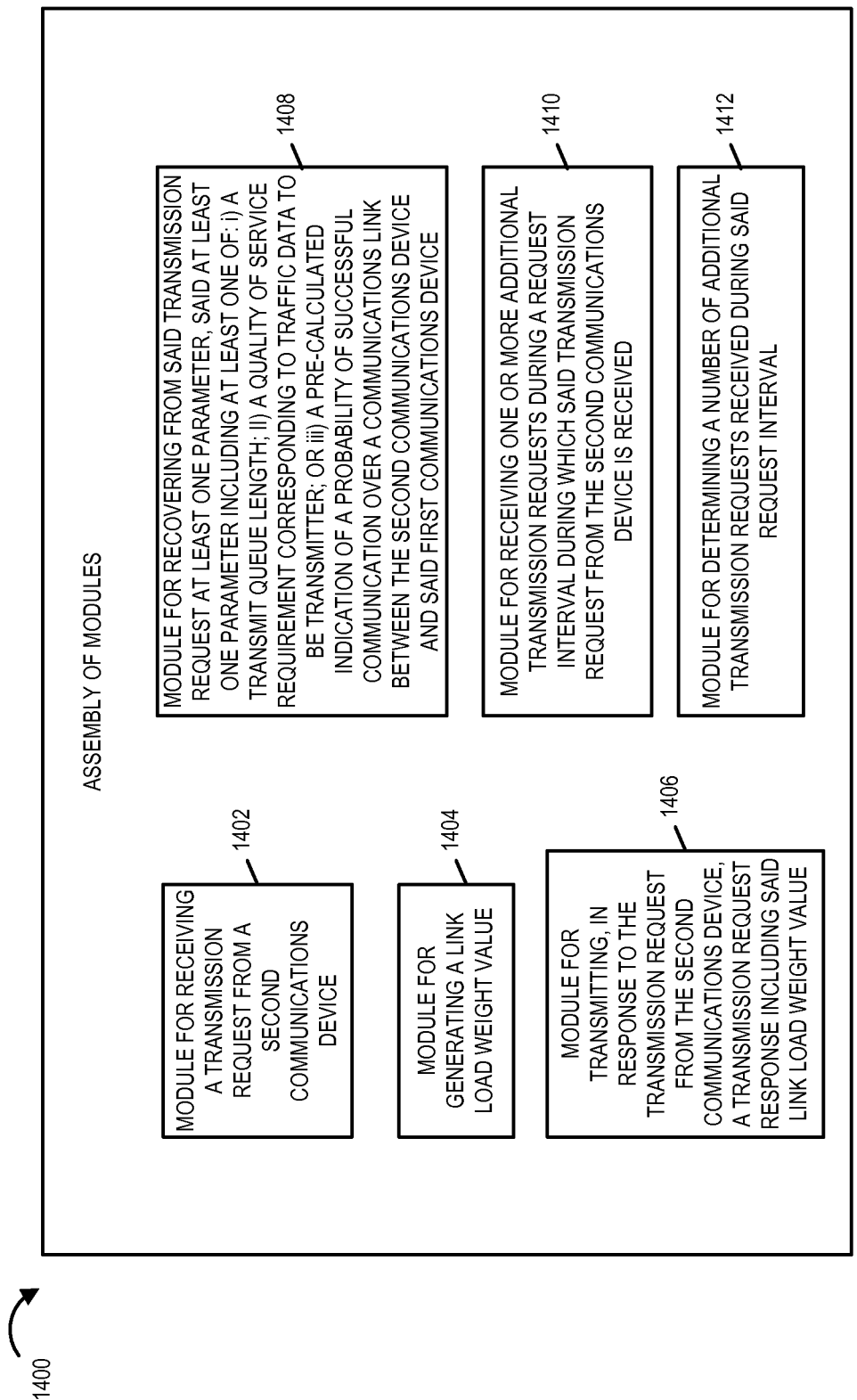
FIG. 14 illustrates an assembly of modules which may be used in the communications device of FIG. 13.

FIG. 14 is an assembly of modules 1400 which can, and in some embodiments are, used in the first communications device 1300 illustrated in FIG. 13. The modules in the assembly 1400 can be implemented in hardware within the processor 1302 of FIG. 13, e.g., as individual circuits. Alternatively, the modules may be implemented in software and stored in the memory 1304 of the communications device 1300 shown in FIG. 13. While shown in the FIG. 13 embodiment as a single processor, e.g., computer, it should be appreciated that the processor 1302 may be implemented as one or more processors, e.g., computers. When implemented in software the modules include code, which when executed by the processor, configure the processor, e.g., computer, 1302 to implement the function corresponding to the module. In embodiments where the assembly of modules 1400 is stored in the memory 1304, the memory 1304 is a computer program product comprising a computer readable medium comprising code, e.g., individual code for each module, for causing at least one computer, e.g., processor 1302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 14 control and/or configure the first communications device 1300 or elements therein such as the processor 1302, to perform the functions of the corresponding steps illustrated in the method flowchart 200 of FIG. 2.

As illustrated in FIG. 14, the assembly of modules 1400 includes a module 1402 for receiving a transmission request from a second communications device, a module 1404 for generating a link load weight value and a module 1406 for transmitting, in response to the transmission request from the second communications device, a transmission request response including said link load weight value. The assembly of modules 1400 further includes a module 1408 for recovering from said transmission request at least one parameter, said at least one parameter including at least one of: i) a transmit queue length; ii) a quality of service requirement corresponding to traffic data to be transmitted; or 3) a pre-calculated indication of a probability of successful communication over a communication link between the second communications device and said first communications device. The module 1404 for generating a link load weight value is configured in some embodiments to use said at least one parameter in combination with at least some local information when generating said link load weight value. The assembly of modules 1400 further includes a module 1410 for receiving one or more additional transmission requests during a request interval during which said transmission request from the second communications device is received and a module 1412 for determining a number of additional transmission requests received during said request interval. In some but not necessarily all embodiments, the module 1404 for generating said link load weight value generates the link load weight value based on the determined number of additional transmission requests. In at least some such embodiments the module 1404 for generating said link load weight value generates the link load weight value also based on indicated transmit queue lengths and quality of service requirements indicated in the received additional transmission requests.

Figure 15:
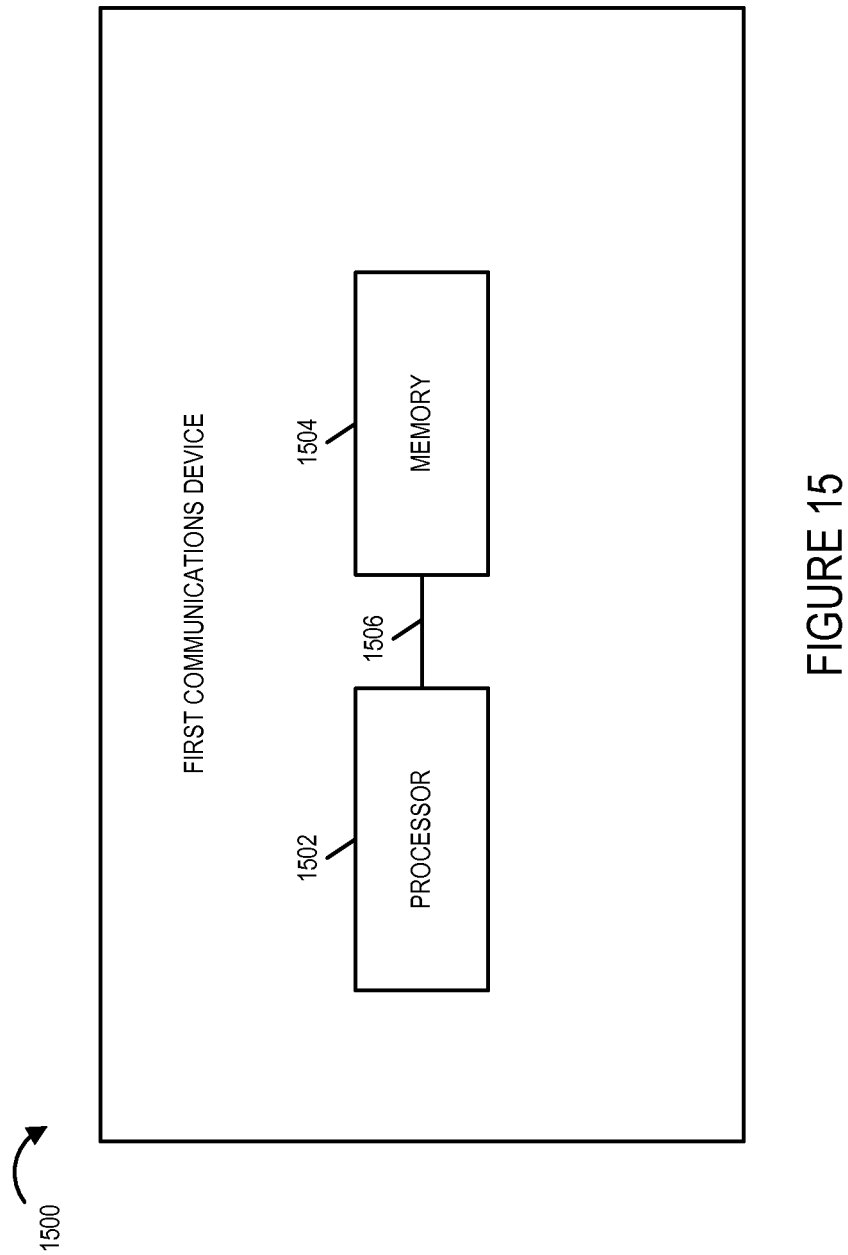
FIG. 15 is a drawing of an exemplary first communications device in accordance with an exemplary embodiment.

FIG. 15 is a drawing of an exemplary first communications device 1500 in accordance with an exemplary embodiment. First communications device 1500 is, e.g., a mobile wireless terminal supporting peer to peer communications and implementing a method in accordance with flowchart 400 of FIG. 4. First communications device 1500 includes a processor 1502 and memory 1504 coupled together via a bus 1506 over which the various elements (1502, 1504) may interchange data and information. Processor 1502 is configured to: receive a request response from a second communications device which is in response to a transmission request from said first communications device; receive a first link load weight value from a third communications device; and make a transmitter yielding decision based on the first link load weight value received from the third communications device. The processor 1502, in some such embodiments, is further configured to receive said first link load weight value in a request response from the third communications device.

In various embodiments, the processor 1502 is further configured to: generate, prior to said receiving said request response from the second communications device, a second link load weight value based on at least one of: i) a transmit queue length; ii) a quality of service requirement corresponding to traffic data to be transmitted; or iii) a pre-calculated indication of a probability of successful communication over a communication link between the first communications device and said second communications device; and transmit, prior to said receiving said request response from the second communications device, said transmission request to said second communications device, said transmission request including said generated second link load weight value.

The processor 1502, in some embodiments, is configured to recover a second link load weight value from the received request response from the second communications device. In some embodiments, the processor 1502 is configured to generate an interference cost estimate based on the first link load weight value received from the third communications device and a second link load weight value corresponding to a connection between said first communications device and said second communications device as part of making said transmitter yielding decision.

Figure 16:
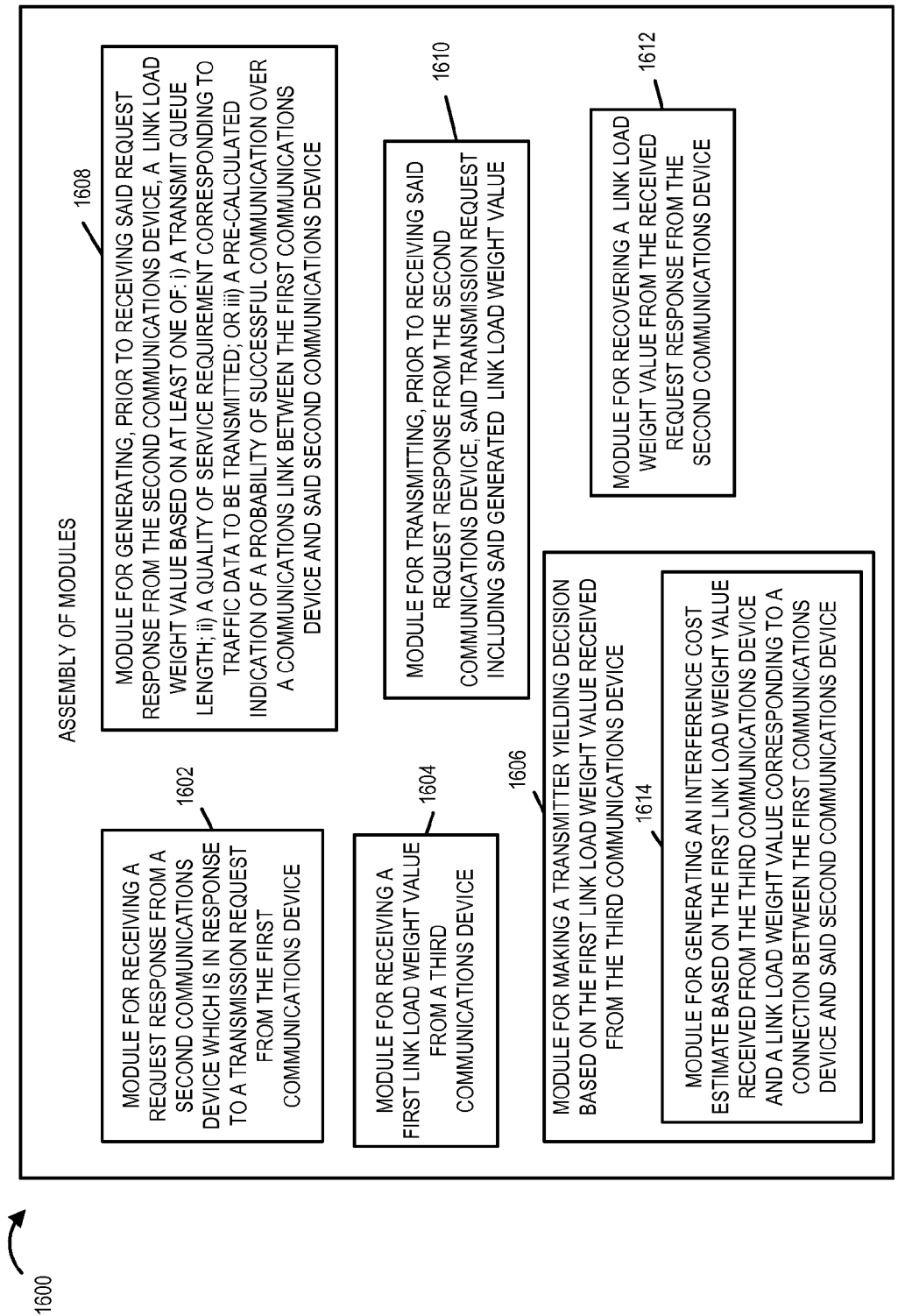
FIG. 16 illustrates an assembly of modules which may be used in the communications device of FIG. 15.

FIG. 16 is an assembly of modules 1600 which can, and in some embodiments are, used in the first communications device 1500 illustrated in FIG. 15. The modules in the assembly 1600 can be implemented in hardware within the processor 1502 of FIG. 15, e.g., as individual circuits. Alternatively, the modules may be implemented in software and stored in the memory 1504 of the first communications device 1500 shown in FIG. 15. While shown in the FIG. 15 embodiment as a single processor, e.g., computer, it should be appreciated that the processor 1502 may be implemented as one or more processors, e.g., computers. When implemented in software the modules include code, which when executed by the processor 1502, configure the processor, e.g., computer, 1502 to implement the function corresponding to the module. In embodiments where the assembly of modules 1600 is stored in the memory 1604, the memory 1604 is a computer program product comprising a computer readable medium comprising code, e.g., individual code for each module, for causing at least one computer, e.g., processor 1502, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 16 control and/or configure the communications device 1500 or elements therein such as the processor 1502, to perform the functions of the corresponding steps illustrated in the method flowchart 400 of FIG. 4.

As illustrated in FIG. 16, the assembly of modules 1600 includes: a module 1602 for receiving a request response from a second communications device which is in response to a transmission request from said first communications device; a module 1604 for receiving a first link load weight value from a third communications device; and a module 1606 for making a transmitter yielding decision based on the first link load weight value received from the third communications device. In some embodiments, the first link load weight value is received in a request response from the third communications device.

The assembly of modules 1600, in some embodiments, further includes: a module 1610 for generating, prior to said receiving said request response from the second communications device, a link load weight value based on at least one of: i) a transmit queue length; ii) a quality of service requirement corresponding to traffic data to be transmitted; or iii) a pre-calculated indication of a probability of successful communication over a communication link between the first communications device and said second communications device; and a module for transmitting, prior to said receiving said request response from the second communications device, said transmission request to said second communications device, said transmission request including said generated link load weight value.

The assembly of modules 1600 may, and sometimes does, include a module 1612 for recovering a link load weight value from the received request response from the second communications device.

In some but not necessarily all embodiments, the module 1604 for making a transmitter yielding decision based on the first link load weight value received from the third communications device includes a module 1614 for generating an interference cost estimate based on the first link load weight value received from the third communications device and a link load weight value corresponding to a connection between the first communications device and the second communications device.

The techniques of various embodiments may be implemented using software, hardware and/or a combination of software and hardware. Various embodiments are directed to apparatus, e.g., mobile nodes such as mobile access terminals, base stations including one or more attachment points, and/or communications systems. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, receiving a transmission request signal, generating a link load weight value, transmitting a transmission request response including a link load weight value, receiving a request response signal, recovering a link load weight value, making a transmitter yielding decision based on a received link load weight value, etc. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

In some embodiments, the processor or processors, e.g., CPUs, of one or more devices, e.g., communications devices such as wireless terminals are configured to perform the steps of the methods described as being as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

While described in the context of an OFDM system, at least some of the methods and apparatus of various embodiments are applicable to a wide range of communications systems including many non-OFDM and/or non-cellular systems. At least some of the methods and apparatus are applicable to hybrid systems, e.g. a system including OFDM and CDMA signaling techniques.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method of operating a first communications device, comprising:
    receiving a first transmission request from a second communications device;
    generating a link load weight value based on at least some local information;
    transmitting, in response to the first transmission request from the second communications device, a transmission request response including said link load weight value; and
    using a second transmission request received from a third communication device to make a receiver yielding decision regarding whether the first communications device will receive or refrain from receiving traffic data from the second communications device.

2. The method of claim 1, further comprising:
    recovering from said first transmission request at least one parameter, said at least one parameter including at least one of:
    i) a transmit queue length;
    ii) a quality of service requirement corresponding to traffic data to be transmitted; or
    iii) a pre-calculated indication of a probability of successful communication over a connection between the second communications device and said first communications device.

3. The method of claim 2, wherein said generating a link load weight value includes using said at least one parameter in combination with the at least some local information.

4. The method of claim 2, further comprising:
    receiving one or more additional transmission requests during a request interval during which said first transmission request from the second communications device is received;
    determining a number of additional transmission requests received during said request interval; and
    wherein said link load weight value is generated based on the determined number of additional transmission requests.

5. The method of claim 4, wherein said link load weight value is also generated based on: indicated transmit queue lengths and quality of service requirements indicated in the received additional transmission requests.

6. A first communications device, comprising:
    at least one processor configured to
        receive a first transmission request from a second communications device,
        generate a link load weight value based on at least some local information,
        transmit, in response to the first transmission request from the second communications device, a transmission request response including said link load weight value; and
        use a second transmission request received from a third communication device to make a receiver yielding decision regarding whether said first communications device will receive or refrain from receiving traffic; data from the second communications device; and
    a memory coupled to the at least one processor.

7. The first communications device of claim 6, wherein the at least one processor is further configured to recover from said first transmission request at least one parameter, said at least one parameter including at least one of:
    i) a transmit queue length;
    ii) a quality of service requirement corresponding to traffic data to be transmitted; or
    iii) a pre-calculated indication of a probability of successful communication over a connection between the second communications device and said first communications device.

8. The first communications device of claim 7, wherein the at least one processor is further configured to generate a link load weight value using said at least one parameter in combination with the at least some local information.

9. The first communications device of claim 7, wherein the at least one processor is further configured to:
receive one or more additional transmission requests during a request interval during which said first transmission request from the second communications device is received;
determine a number of additional transmission requests received during said request interval; and
generate said link load weight value based on the determined number of additional transmission requests.

10. The first communications device of claim 9, wherein the at least one processor is further configured to generate said link load weight value based on: indicated transmit queue lengths and quality of service requirements indicated in the received additional transmission requests.

11. A first communications device comprising:
means for receiving a first transmission request from a second communications device;
means for generating a link load weight value based on at least some local information;
means for transmitting, in response to the first transmission request from the second communications device, a transmission request response including said link load weight value; and
means for using a second transmission request received from a third communication device to make a receiver yielding decision regarding whether said first communications device will receive or refrain from receiving traffic data from the second communications device.

12. The first communications device of claim 11, further comprising:
means for recovering from said first transmission request at least one parameter, said at least one parameter including at least one of:
i) a transmit queue length;
ii) a quality of service requirement corresponding to traffic data to be transmitted; or
iii) a pre-calculated indication of a probability of successful communication over a connection between the second communications device and said first communications device.

13. The first communications device of claim 12, wherein said means for generating a link load weight value is configured to use said at least one parameter in combination with the at least some local information when generating said link load weight value.

14. The first communications device of claim 12, further comprising:
means for receiving one or more additional transmission requests during a request interval during which said first transmission request from the second communications device is received;
means for determining a number of additional transmission requests received during said request interval; and
wherein said means for generating a link load weight value generates a link load weight value based on the determined number of additional transmission requests.

15. The first communications device of claim 14, wherein said means for generating a link load weight value generates a link load weight value is based on: indicated transmit queue lengths and quality of service requirements indicated in the received additional transmission requests.

16. A computer program product comprising:
a non-transitory computer readable medium comprising:
code for causing at least one computer to receive a first transmission request from a communications device;
code for causing the at least one computer to generate a link load weight value based on at least some local information;
code for causing the at least one computer to transmit, in response to the first transmission request from the communications device, a transmission request response including said link load weight value; and
code for causing the at least one computer to a second transmission request received from a third communication device value to make a receiver yielding decision regarding whether the at least one computer will receive or refrain from receiving traffic data from the communications device.

17. The computer program product of claim 16, wherein the non-transitory computer readable medium further comprises:
code for causing the at least one computer to recover from said first transmission request at least one parameter, said at least one parameter including at least one of:
i) a transmit queue length;
ii) a quality of service requirement corresponding to traffic data to be transmitted; or
iii) a pre-calculated indication of a probability of successful communication over a connection between the second communications device and said first communications device.

18. The computer program product of claim 17, wherein the non-transitory computer readable medium further comprises:
code for causing the at least one computer to generate a link load weight value using said at least one parameter in combination with the at least some local information.

19. A method of operating a first communications device, comprising:
establishing a connection between said first communications device and a second communications device;
receiving a first link load weight value from a third communications device, wherein the first link load weight value is based on at least some local information, and wherein the at least some local information comprises an unused buffer capacity; and
making a transmitter yielding decision regarding whether the first communications device will transmit or refrain from transmitting traffic data to the second communications device, wherein said transmitter yielding decision is based on the first link load weight value received from the third communications device and a second link load weight value corresponding to the connection between said first communications device and said second communications device.

20. The method of claim 19, wherein said first link load weight value is received in a request response from the third communications device.

21. The method of claim 20, further comprising:
generating the second link load weight value based on at least one of:
i) a transmit queue length;
ii) a quality of service requirement corresponding to traffic data to be transmitted; or
iii) a pre-calculated indication of a probability of successful communication over a connection between the first communications device and said second communications device; and transmitting said transmission request to said second communications device, said transmission request including said generated second link load weight value.

22. The method of claim 20, further comprising:
receiving a request response from the second communications device; and
recovering a second link load weight value from the received request response from the second communications device.

23. The method of claim 20, wherein said making a transmitter yielding decision comprises:
generating an interference cost estimate based on the first link load weight value received from the third communications device and a second link load weight value corresponding to the connection between said first communications device and said second communications device.

24. The method of claim 23, further comprising:
comparing said generated interference cost estimate to a transmitter yielding threshold value; and
when said comparison indicates that said generated interference cost estimate is below said threshold value, transmitting traffic data to said second communications device.

25. The method of claim 20, wherein said making a transmitter yielding decision comprises:
generating, for a traffic interval, a plurality of interference cost estimates, each corresponding to a different connection having a higher priority than the connection between said first communications device and said second communications device; and
for each of the individual generated plurality of interference cost estimates, comparing said generated interference cost estimate to a transmitter yielding threshold value; and
when said comparisons indicate that each of the different generated interference cost estimates are below said threshold value, transmitting traffic data to said second communications device in said traffic interval.

26. The method of claim 25, further comprising:
when said comparisons indicate that any one of the different generated interference cost estimates corresponding to a higher priority connection is above said threshold value, controlling said first communications device to refrain from transmitting traffic data to said second communications device in said traffic interval.

27. The method of claim 23, wherein said generating an interference cost estimate comprises calculating a spillage value based on said first link load weight value received from the third communications device and a connection measurement value generated from a measurement of a channel between said third communications device and said first communications device.

28. The method of claim 23, wherein said generating an interference cost estimate comprises generating a spillage aggregate corresponding to higher priority connections than said connection between said first communications device and said second communications device.

29. The method of claim 23, wherein said generating an interference cost estimate comprises generating a spillage aggregate corresponding to a set of other connections from which request responses were detected, said set of other connections including connections in which the first communications device does not participate.

30. A first communications device comprising:
at least one processor configured to:
establish a connection between said first communications device and a second communications device;
receive a first link load weight value from a third communications device, wherein the first link load weight value is based on at least some local information, and wherein the at least some local information comprises an unused buffer capacity; and
make a transmitter yielding decision regarding whether said first communications device will transmit or refrain from transmitting traffic data to the second communications device, wherein said transmitter yielding decision is based on the first link load weight value received from the third communications device and a second link load weight value corresponding to the connection between said first communications device and said second communications device; and
a memory coupled to said at least one processor.

31. The first communications device of claim 30, wherein said at least one processor is further configured to receive said first link load weight value in a request response from the third communications device.

32. The first communications device of claim 31, wherein said at least one processor is further configured to:
generate the second link load weight value based on at least one of:
i) a transmit queue length;
ii) a quality of service requirement corresponding to traffic data to be transmitted; or
iii) a pre-calculated indication of a probability of successful communication over the connection between the first communications device and said second communications device; and
transmit a transmission request to said second communications device, said transmission request including said generated second link load weight value.

33. The first communications device of claim 31, wherein said at least one processor is further configured to:
receive a request response from said second communications device; and
recover the second link load weight value from the received request response from the second communications device.

34. The first communications device of claim 31, wherein said at least one processor is further configured to:
generate an interference cost estimate based on the first link load weight value received from the third communications device and the second link load weight value corresponding to the connection between said first communications device and said second communications device as part of making said transmitter yielding decision.

35. A first communications device comprising:
means for establishing a connection between said first communications device and a second communications device;
means for receiving a first link load weight value from a third communications device, wherein the first link load weight value is based on at least some local information, and wherein the at least some local information comprises an unused buffer capacity; and
means for making a transmitter yielding decision regarding whether said first communications device will transmit or refrain from transmitting traffic data to the second communications device, wherein said transmitter yielding decision is based on the first link load weight value received from the third communications device and a second link load weight value corresponding to the connection between said first communications device and said second communications device.

36. The first communications device of claim 35, wherein said first link load weight value is received in a request response from the third communications device.

37. The first communications of claim 36, further comprising:
  means for generating the second link load weight value based on at least one of:
    i) a transmit queue length;
    ii) a quality of service requirement corresponding to traffic data to be transmitted; or
    iii) a pre-calculated indication of a probability of successful communication over the connection between the first communications device and said second communications device; and
  means for transmitting a transmission request to said second communications device, said transmission request including said generated second link load weight value.

38. The first communications device of claim 36, further comprising:
  means for receiving a request response from said second communications device; and
  means for recovering the second link load weight value from the received request response from the second communications device.

39. The first communications device of claim 36, wherein said means for making a transmitter yielding decision comprises:
  means for generating an interference cost estimate based on the first link load weight value received from the third communications device and the second link load weight value corresponding to the connection between said first communications device and said second communications device.

40. A computer program product comprising:
a non-transitory computer readable medium comprising:
  code for causing at least one computer to establish a connection between the at least one computer and a second communications device;
  code for causing the at least one computer to receive a first link load weight value from a third communications device, wherein the first link load weight value is based on at least some local information, and wherein the at least some local information comprises an unused buffer capacity; and
  code for causing the at least one computer to make a transmitter yielding decision regarding whether the at least one computer will transmit or refrain from transmitting traffic data to the second communications device, wherein said transmitter yielding decision is based on the first link load weight value received from the third communications device and a second link load weight value corresponding to the connection between the at least one computer and said second communications device.

* * * * *